(12) United States Patent
Isozu et al.

(10) Patent No.: US 8,451,801 B2
(45) Date of Patent: May 28, 2013

(54) WIRELESS COMMUNICATION DEVICE AND WIRELESS COMMUNICATION SYSTEM

(75) Inventors: Masaaki Isozu, Tokyo (JP); Kazuhiro Watanabe, Kanagawa (JP)

(73) Assignee: Sony Corporation, Tokyo (JP)

( * ) Notice: Subject to any disclaimer, the term of this patent is extended or adjusted under 35 U.S.C. 154(b) by 1004 days.

(21) Appl. No.: 12/036,820

(22) Filed: Feb. 25, 2008

(65) Prior Publication Data

US 2009/0016281 A1 Jan. 15, 2009

(30) Foreign Application Priority Data

Feb. 26, 2007 (JP) ................. P2007-046126
May 14, 2007 (JP) ................. P2007-128354

(51) Int. Cl.
*H04W 4/00* (2009.01)
*H04L 12/56* (2006.01)

(52) U.S. Cl.
USPC .......................................... 370/332; 370/401

(58) Field of Classification Search
None
See application file for complete search history.

(56) References Cited

U.S. PATENT DOCUMENTS

| | | | |
|---|---|---|---|
| 7,185,054 B1 * | 2/2007 | Ludwig et al. ................ | 709/204 |
| 2003/0156558 A1 * | 8/2003 | Cromer et al. ................ | 370/331 |
| 2005/0036487 A1 * | 2/2005 | Srikrishna .................... | 370/389 |
| 2005/0075846 A1 * | 4/2005 | Kim ............................... | 703/1 |
| 2006/0176834 A1 * | 8/2006 | Dickerson et al. ............ | 370/260 |
| 2007/0168426 A1 * | 7/2007 | Ludwig et al. ................ | 709/204 |
| 2008/0009324 A1 * | 1/2008 | Patel ............................. | 455/566 |
| 2008/0031203 A1 * | 2/2008 | Bill ............................... | 370/338 |
| 2008/0129816 A1 * | 6/2008 | Mattila et al. ............. | 348/14.08 |
| 2008/0225730 A1 * | 9/2008 | Srikrishna .................... | 370/238 |

FOREIGN PATENT DOCUMENTS

| | | |
|---|---|---|
| JP | 2000-287188 | 10/2000 |
| JP | 2002-300548 | 11/2002 |
| JP | 2004-147029 | 5/2004 |
| JP | 2004-289411 | 10/2004 |
| JP | 2006-270839 | 10/2006 |

* cited by examiner

*Primary Examiner* — Eunsook Choi
(74) *Attorney, Agent, or Firm* — Finnegan, Henderson, Farabow, Garrett & Dunner, LLP

(57) ABSTRACT

A wireless communication device configured to perform communication with another wireless communication device which exists outside the wireless communication range by performing communication through a path via a neighboring wireless communication device includes: a communication control unit configured to compute the number of links until a signal from the other wireless communication device is received; a device information holding unit configured to associate the number of computed links with information relating to the other wireless communication device and holding therein; and a display control unit configured to control the information relating to the other wireless communication device associated to the number of links based on the number of links, so as to be displayed.

10 Claims, 26 Drawing Sheets

FIG. 17

| NODE ADDRESS | USER IDENTIFIER | NUMBER OF HOPS | ATTRIBUTE | FRIEND |
|---|---|---|---|---|
| B | Bill | 1 | ABC UNIVERSITY CHUO CITY | 1 |
| C | Cindy | 1 | LMN UNIVERSITY SHINAGAWA CITY | 1 |
| D | Dean | 1 | ABC UNIVERSITY SHINAGAWA CITY | 0 |
| E | Erin | 2 | ABC UNIVERSITY CHUO CITY | 1 |
| F | Fiona | 2 | XYZ UNIVERSITY SHINAGAWA CITY | 0 |
| G | Gordon | 3 | XYZ UNIVERSITY CHUO CITY | 0 |

131 132 133 134 135

TO: USER B <userB@share.xxx.co.jp>

FROM: USER A <userA@share.xxx.co.jp>

MESSAGE ID: S200701011200

SHARING TIME: ALL DAY TODAY

FIG. 20

| SHARING USER NAME 191 | SHARING USER IDENTIFIER 192 | IP ADDRESS 193 | SHARING TIME 194 | SYNCHRONIZING COMPLETE IMAGE IDENTIFIER 195 |
|---|---|---|---|---|
| Bill | \<bill@share.xxx.co.jp\> | 192.168.0.102 | 01/10/2007 00:00 | DSC01050 |
| Cindy | \<cindy@share.xxx.co.jp\> | 192.168.0.103 | 01/09/2007 17:30 | DSC01050 |
| Dean | \<dean@share.xxx.co.jp\> | 192.168.0.104 | 01/16/2007 14:30 | DSC01040 |
| .... | .... | .... | .... | .... |

(CURRENT TIME: 01/09/2007 14:30
NEWEST IMAGE IDENTIFIER: DSC01060)

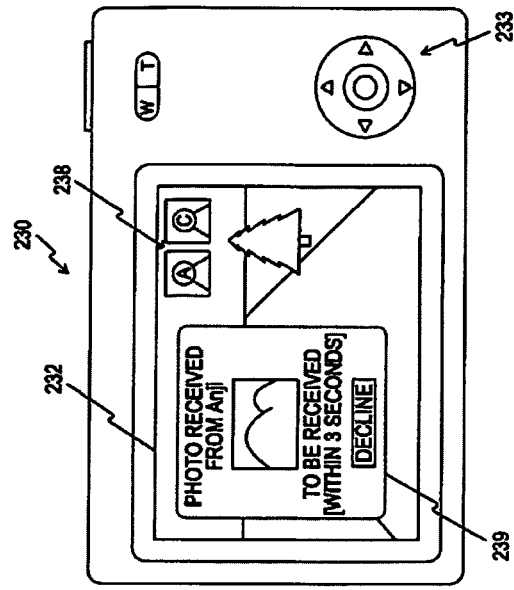
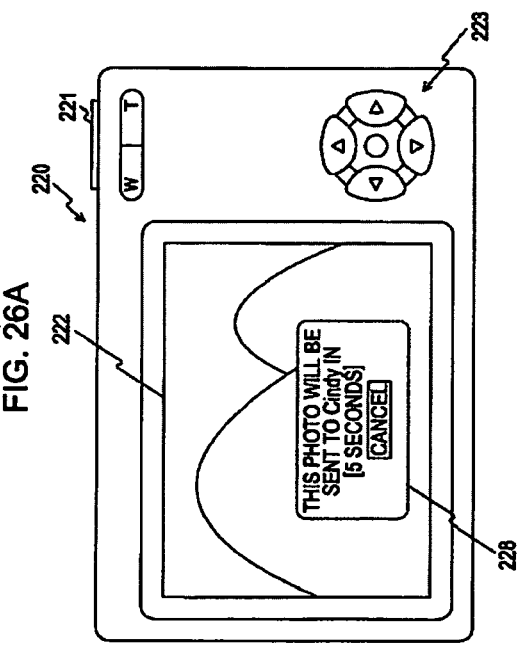
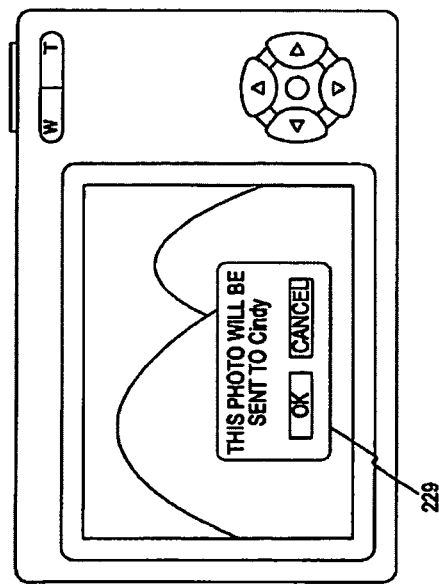

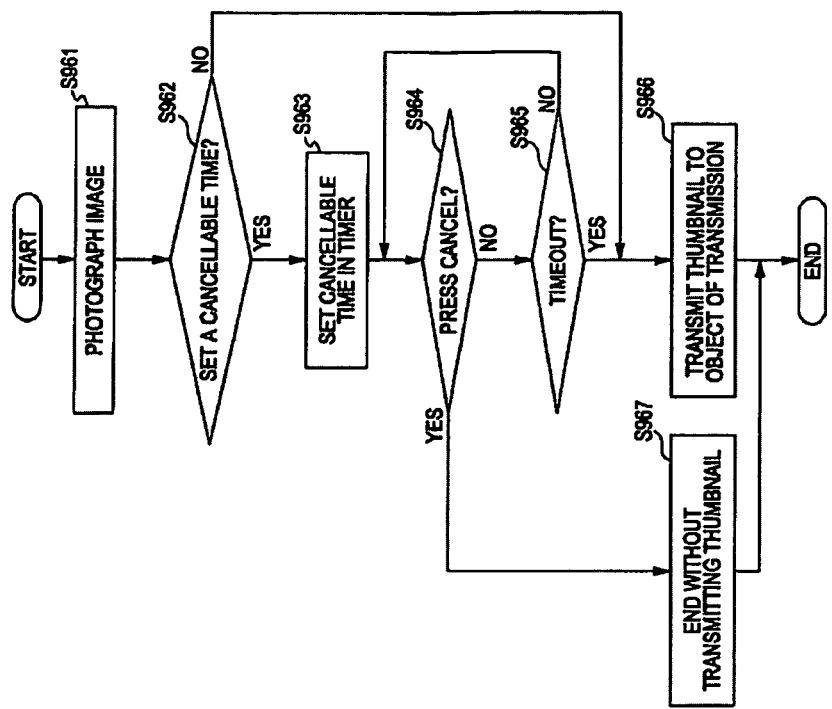
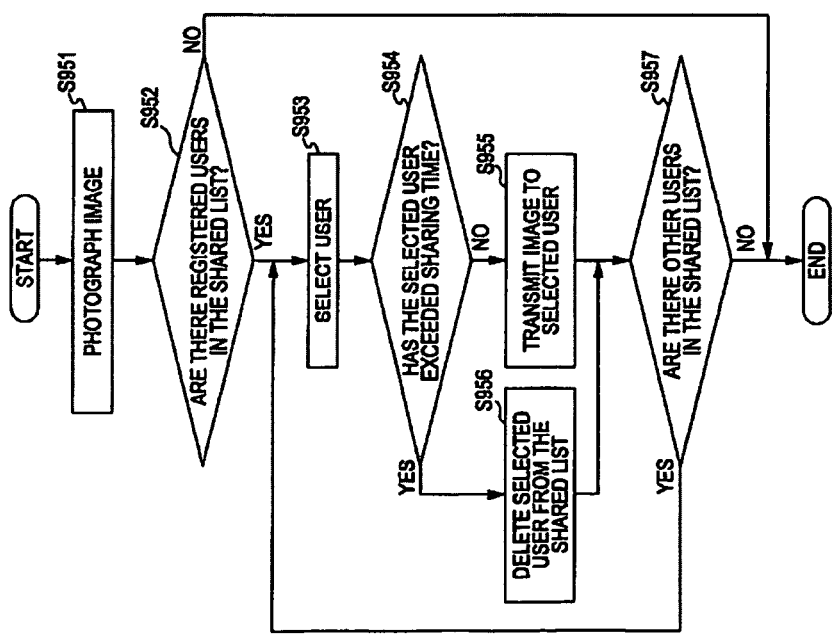

WIRELESS COMMUNICATION DEVICE AND WIRELESS COMMUNICATION SYSTEM

CROSS REFERENCES TO RELATED APPLICATIONS

The present invention contains subject matter related to Japanese Patent Application JP 2007-046126 filed in the Japanese Patent Office on Feb. 26, 2007, and Japanese Patent Application JP 2007-128354 filed in the Japanese Patent Office on May 14, 2007, the entire contents of which are incorporated herein by reference.

BACKGROUND OF THE INVENTION

1. Field of the Invention

The present invention relates to a wireless communication system, and in particular relates to a wireless communication system wherein communication is performed with another wireless communication device which exists outside the wireless communication range by relaying between wireless communication devices, the wireless communication devices in this system, the processing method therewith, and a program causing a computer to execute this method.

2. Description of the Related Art

A mesh network (ad hoc network) is a technology regarding which standardization is progressing, such as with MANET (Mobile Ad-hoc Network) of the IETF (Internet Engineering Task Force) and IEEE (Institute of Electrical and Electronic Engineers) 802.11s. With this mesh network, overall control by a particular access point is not performed, but a network is formed by arbitrary wireless communication devices which operate as wireless terminals are autonomously distributed and directly perform asynchronous wireless communication with one another. That is to say, with this mesh network, the communication as to a wireless communication device existing in a range where electrical waves do not reach directly, communication is realized by routing via another wireless communication device (so-called multi-hop communication).

With this mesh network, in order for each wireless communication device (node) to be autonomously distributed and directly perform asynchronous wireless communication with one another, it is important for not only the administrator but also the user to understand the connection states between these nodes.

As technology to display a connection state between such nodes, a connection relation for nodes in a wireless communication network has been proposed wherein the nodes connected to one another are displayed by connecting with a straight line (e.g. Japanese Unexamined Patent Application Publication No. 2002-151620).

SUMMARY OF THE INVENTION

With the above-described current technology, a mark representing a node is disposed on the circumference of a circle and the connection relation between each node is displayed with a straight line. With such a display method, whether or not there is connectivity between the nodes in the wireless communication network can be shown.

However, with the mesh network, each wireless communication device performs communication with multi-hop communication, whereby only displaying whether or not there is connectivity between the nodes is insufficient, and whether or not communication is possible cannot be determined without tracing the connections between the nodes.

Also, since with a portable terminal the screen size is relatively small, displaying the entire network in the case that the number of terminals is increased becomes difficult.

There has been recognized the need to provides efficient display of information relating to wireless communication devices in a mesh network.

According to an embodiment of the present invention, a wireless communication device configured to perform communication with another wireless communication device which exists outside the wireless communication range by performing communication through a path via a neighboring wireless communication device, includes: a communication control unit configured to compute the number of links until a signal from the other wireless communication device is received; a device information holding unit configured to associate the number of computed links with information relating to the other wireless communication device and holding therein; and a display control unit configured to control the information relating to the other wireless communication device associated to the number of links based on the number of links, so as to be displayed. Thereby information can be displayed relating to the other wireless communication devices based on the number links (number of hops) from the other wireless communication devices.

The signal of the other wireless communication device may include a lifetime initial value and a current value of the signal in a header portion, with the communication control unit transferring the current value of the lifetime regarding the signal from the other wireless communication device, after updating the current value, to yet another wireless communication device, while also performing computing of the number of links based on the initial value and the current value of the lifetime. In this case, the communication control unit may subtract 1 from the current value of the lifetime regarding the signal from the other wireless communication device, and if the result thereof is not 0, transfer to yet another wireless communication device, while also performing computing of the number of links by subtracting the current value from the initial value of the lifetime.

The display control unit may display information relating to the other wireless communication device which is associated with the number of links by display size according to the number of links. Thus, from the display size, the connectivity state between the wireless communication devices can be understood intuitively. In such a case, in particular, information relating to the other wireless communication device which is associated with the number of links can be displayed so that the smaller the number of links is the greater the display size is.

The display control unit may display information relating to the other wireless communication device which is associated with the number of links by display color according to the number of links. Thus, from the display color, the connectivity state between the wireless communication devices can be understood intuitively.

The display control unit may display information relating to the other wireless communication device which is associated with the number of links by background according to the number of links. Thus, from the background, the connectivity state between the wireless communication devices can be understood intuitively.

The display control unit may display the number of links as well as information relating to the other wireless communication device which is associated with the number of links. Thus, the number of links itself can be understood simultaneously.

The display control unit may display information relating to a user of the other wireless communication device as information relating to the other wireless communication device. Thus, the number of links, as well as information relating to the user of the wireless communication device, can be understood together intuitively.

According to an embodiment of the present invention, a wireless communication system, wherein each wireless communication device performs communication with another wireless communication device which exists outside the wireless communication range by performing communication through a path via a neighboring wireless communication device, includes: a communication control unit configured to compute the number of links until a signal from the other wireless communication device is received; a device information holding unit configured to associate the number of computed links with information relating to the other wireless communication device and holding therein; and a display control unit configured to control the information relating to the other wireless communication device associated to the number of links based on the number of links, so as to be displayed. Thus, information relating to the other wireless communication device based on the number of links in the wireless communication system can be displayed.

According to an embodiment of the present invention, a display method for a wireless communication device to perform communication with another wireless communication device which exists outside the wireless communication range by performing communication through a path via a neighboring wireless communication device includes the steps of: receiving the signal from the other wireless communication device from the neighboring wireless communication device; computing the number of links until the signal from the other wireless communication device is received based on the signal from the other wireless communication device; and displaying information relating to the other wireless communication device corresponding to the number of links based on the computed number of links. Also provided is a program causing a computer to execute the steps. Thus, information relating to the other wireless communication device based on the number of links in the wireless communication system can be displayed.

According to an embodiment of the present invention, a wireless communication device configured to perform communication with another wireless communication device comprising: imaging unit to image an image; shared proposal message transmission unit to send a message which proposes sharing an image which is imaged by the imaging unit to the other wireless communication device; shared list holding unit to hold an identifier of the other wireless communication device as a shared list upon receiving acknowledgement from the other wireless communication device as to the shared proposal message; and image transmission unit to transmit the image which is imaged by the imaging unit to the other wireless communication device wherein the identifier is held in the shared list. Thus, a shared list is created through a proposal message for imaged image sharing, and the image is transmitted based on the shared list. Note that the proposal message for imaged image sharing is realized by an invitation, for example.

The shared list may hold a time limit corresponding to the identifier; and wherein upon the time limit being exceeded, the corresponding identifier becomes invalid. Thus, the time limit for sharing images can be restricted.

The image transmitting unit may send a reduced image of the image which is imaged by the imaging unit to the other wireless communication device; and wherein only in the event of not being declined, the image which is imaged by the imaging unit is sent to the other wireless communication device. Thus, unnecessary image transmissions can be alleviated.

According to an embodiment of the present invention, a wireless communication system wherein each wireless communication device performs communication with another wireless communication device, each wireless communication device including: an imaging unit configured to image an image; a shared proposal message transmission unit configured to send a message which proposes sharing an image which is imaged by the imaging unit to the other wireless communication device; a shared list holding unit configured to hold an identifier of the other wireless communication device as a shared list upon receiving acknowledgement from the other wireless communication device as to the shared proposal message; and an image transmission unit configured to transmit the image which is imaged by the imaging unit to the other wireless communication device wherein the identifier is held in the shared list. Thus, a shared list is created through a proposal message for imaged image sharing from one of the wireless communication devices making up the wireless communication system, whereby an image is transmitted based on the shared list.

According to an embodiment of the present invention, an image transmission method for a wireless communication device which has an imaging unit to image an image and which performs communication with another wireless communication device includes the steps of: sending a message which proposes sharing an image which is imaged by the imaging unit to the other wireless communication device; holding an identifier of the other wireless communication device as a shared list upon receiving acknowledgement from the other wireless communication device as to the shared proposal message; and transmitting the image which is imaged by the imaging unit to the other wireless communication device wherein the identifier is held in the shared list. Also provided is a program causing a computer to execute the steps. Thus, a shared list is created thought the proposal message for imaged image sharing, whereby the image is transmitted based on the shared list.

According to embodiments of the present invention, an excellent advantage can be obtained in that information relating to a wireless communication device in a mesh network can be efficiently displayed.

The communication control unit in the above-described configurations corresponds to a communication control unit 120, for example, in the later-described embodiments. Also, the device information holding unit in the above-described configurations corresponds to a peripheryneighbor node table 130, for example, in the later-described embodiments. Also, the display control unit in the above-described configurations corresponds to a display control unit 170, for example, in the later-described embodiments.

The receiving procedure in the above-described configurations corresponds to step S912, for example, in the later-described embodiments. Also, the computing procedure in the above-described configurations corresponds to step S913, for example, in the later-described embodiments. Also, the display procedure in the above-described configurations corresponds to step S924, for example, in the later-described embodiments.

The imaging unit in the above-described configurations corresponds to an imaging unit 201, for example, in the later-described embodiments. Also, the shared proposal message transmission unit and image transmission unit in the above-described configurations corresponds to the communication control unit 120, for example, in the later-described embodiments. Also, the shared list holding unit in the above-described configurations corresponds to a shared list holding unit 190, for example, in the later-described embodiments.

The imaging unit in the above-described configurations corresponds to an imaging unit 201, for example, in the later-described embodiments. Also, the shared proposal message transmission step in the above-described configurations corresponds to step S931, for example, in the later-described embodiments. Also, the shared list holding step in the above-described configurations corresponds to step S935, for example, in the later-described embodiments. Also, the image transmission step in the above-described configurations corresponds to step S955, for example, in the later-described embodiments.

Note that the processing procedures described according to the embodiments of the present invention may be arranged as a method of having a series of such steps, or may be arranged as a program which causes a computer to execute such a series of procedures by way of a recording medium to store the program.

BRIEF DESCRIPTION OF THE DRAWINGS

FIG. 17 is a diagram illustrating another example of the field configuration of the peripheryneighbor node table 130 according to an embodiment of the present invention;

FIG. 20 is a diagram illustrating a field configuration example of a shared list held in a shared list holding unit 190 according to an embodiment of the present invention;

FIGS. 26A and 26B are diagrams illustrating a screen display example in the event that imaging is performed while in an image sharing state according to an embodiment of the present invention;

FIG. 27 is a diagram illustrating a screen display example in the event that an image is received while in an image sharing state according to an embodiment of the present invention;

FIG. 30 is a flowchart illustrating a first procedure example of processing during imaging of an image according to an embodiment of the present invention;

FIG. 31 is a flowchart illustrating a second procedure example of processing during imaging of an image according to an embodiment of the present invention.

DESCRIPTION OF THE PREFERRED EMBODIMENTS

Next, embodiments of the present invention will be described in detail with reference to the appended diagrams.

Figure 1:
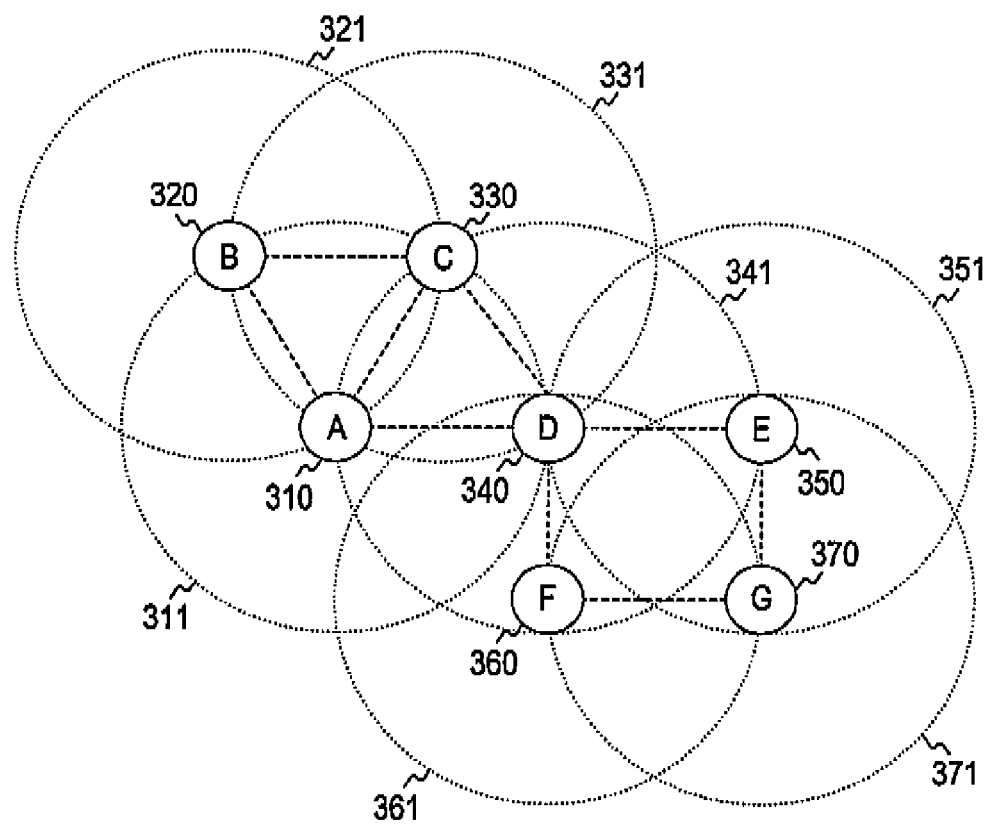
FIG. 1 is a diagram illustrating an example of a wireless communication system according to an embodiment of the present invention.

FIG. 1 is a diagram illustrating an example of a wireless communication system according to an embodiment of the present invention. With this wireless communication system, seven wireless communication devices 310(A), 320(B), 330 (C), 340(D), 350(E), 360(F), and 370(G) make up a mesh network (ad hoc network) with wireless communication. Here, each of the wireless communication devices 310 through 370 is autonomously distributed and operated, whereby a control station such as with an infrastructure network does not exist.

A wireless communication range 311 shows a wireless communication range of the wireless communication device 310(A). Similarly, a wireless communication range 321 shows a wireless communication range of the wireless communication device 320(B), a wireless communication range 331 shows a wireless communication range of the wireless communication device 330(C), a wireless communication range 341 shows a wireless communication range of the wireless communication device 340(D), a wireless communication range 351 shows a wireless communication range of the wireless communication device 350(E), a wireless communication range 361 shows a wireless communication range of the wireless communication device 360(F), a wireless communication range 371 shows a wireless communication range of the wireless communication device 370(G). Wireless communication devices within such wireless communication ranges can perform direct wireless communication with each other. Wireless communication devices in such a relation are connected with dotted lines in the drawing.

For example, in the case of sending data from the wireless communication device 340(D) to the wireless communication device 370(G), since both devices are not in the communication ranges 341 and 371 of one another, direct wireless communication cannot be performed. Thus, data from the wireless communication device 340(D) is temporarily received by the wireless communication device 350(E) as a relay station, having both devices in the communication range 351, and sends this data to the wireless communication device 370(G) which is a partner station. In an autonomously distributed wireless network, communication can thus be performed with a partner station outside the communication range, by another wireless communication device functioning as a relay station.

Thus, the one-on-one connection between each wireless communication device and another wireless communication device wherein communication is performed directly is called a link, and the count thereof is called the number of links or the number of hops. Also, the flow from a certain wireless communication device via a relay station to arrive the partner station is called a path.

Note that description is made here with a wireless communication system example configured with the seven wireless communication devices, but the number of wireless communication devices may be any number.

Figure 2:
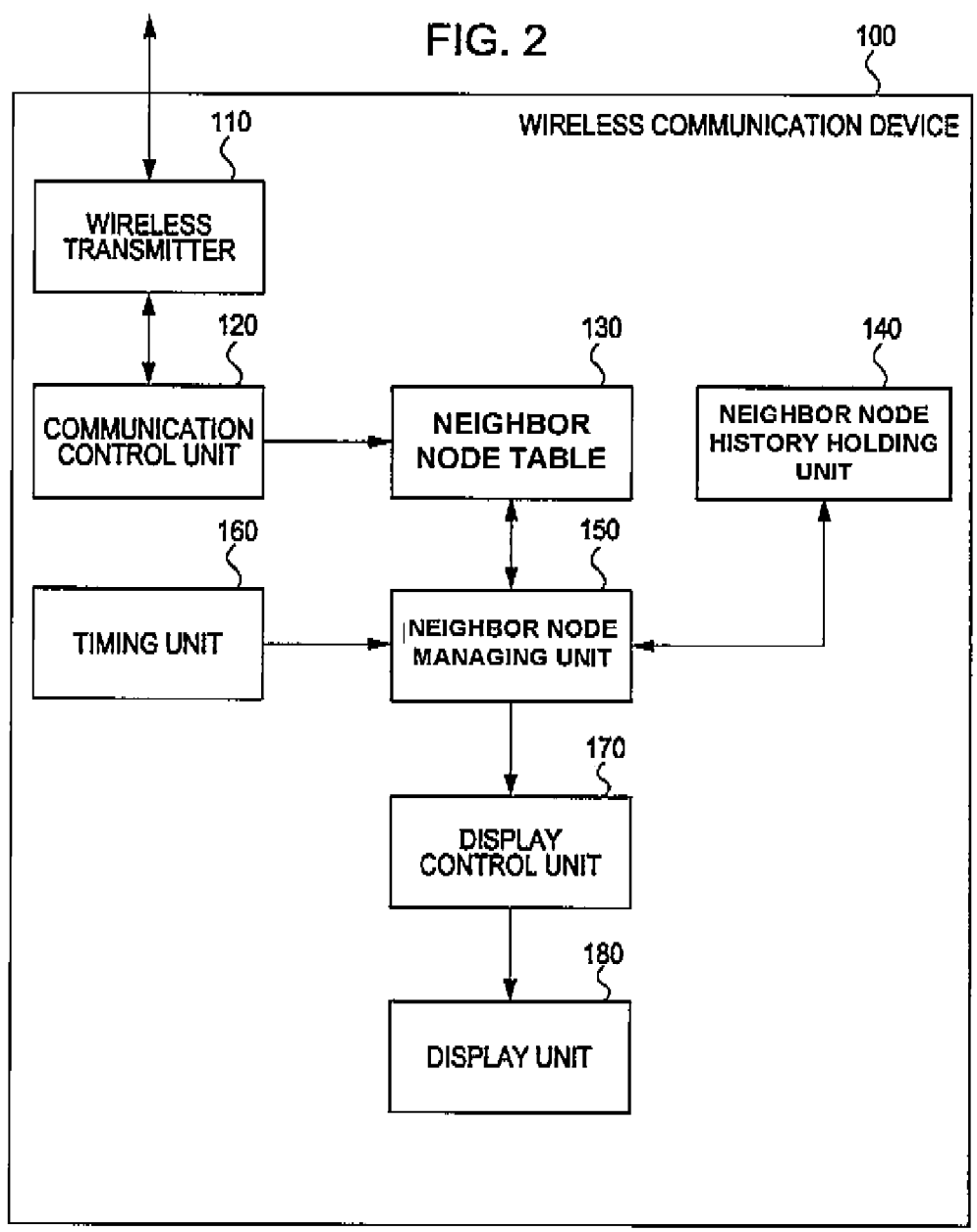
FIG. 2 is a diagram illustrating a configuration example of a wireless communication device 100 according to an embodiment of the present invention.

FIG. 2 is a diagram illustrating a first configuration example of a wireless communication device 100 according to an embodiment of the present invention. The wireless communication device 100 comprises a wireless transmitter 110, communication control unit 120, peripheryneighbor node table 130, peripheryneighbor node history holding unit 140, peripheryneighbor node managing unit 150, timing unit 160, display control unit 170, and display unit 180.

The wireless transmitter 110 performs physical wireless transmission with another wireless communication device. Note that an antenna (not shown) is connected to the wireless transmitter 110, whereby wireless communication is performed with another wireless communication device via the antenna.

The communication control unit 120 controls data transmission with the wireless communication device 100 as the transmission origin, and data transfer with the other wireless communication device as the transmission origin. With a mesh network, in order for each wireless communication device to indicate its own existence, a message is transmitted periodically in some form. Here, such a periodic message is called a node information notification message. The communication control unit 120 computes the number of links (number of hops) until the node information notification message is received from the other wireless communication device.

The peripheryneighbor node table 130 is a table which holds information relating to the other wireless communication devices (peripheryneighbor nodes) regarding which paths are established with the wireless communication device 100 as a peripheryneighbor node list. The number of hops to reach the wireless communication device 100 is held in the peripheryneighbor node list, as described later. The peripheryneighbor node history holding unit 140 holds the history of the peripheryneighbor node list held in the peripheryneighbor node table 130.

In order to search the peripheryneighbor node, two types which are an active mode and a passive mode may be used. The active mode sends a search message as to a neighboring wireless communication device when power is turned on or with instructions by a user as an opportunity. The passive mode sends a search message periodically from each wireless communication device. In either case, the search messages are sent with a broadcast employing flooding. The search message includes a user name or an identifier (MAC address or the like) to uniquely identify the wireless communication device, as well as an identifier of the wireless communication device of the image sharing partner as in an embodiment to be described later. With the embodiment of the present invention, description will be made assuming the active mode, from the perspective of power consumption.

Note that a mesh network may cover a wide area, so a peripheryneighbor node list may overflow the peripheryneighbor node table 130. Therefore, so that the number of peripheryneighbor nodes to be displayed does not increase excessively, a limited number of hops may be set on the receiving side of the node information notification message beforehand. That is to say, in the case that a node information notification message exceeding the limit of number of hops is received at the communication control unit 120, the node information notification message is discarded. On the other hand, on the transmission side, the number of hops to transmit can be limited by adjusting the lifetime 614 of the node information notification message. However, as described later, narrowing down by the number or hops and so forth in the event of displaying can be made with the display control unit 170.

The peripheryneighbor node managing unit 150 manages the peripheryneighbor node list held in the peripheryneighbor node table 130. That is to say, the peripheryneighbor node managing unit 150 references the peripheryneighbor node managing unit 150 each time a predetermined amount of time passes, and supplies the content of the peripheryneighbor node list to the display control unit 170. In this event, the peripheryneighbor node managing unit 150 moves the content of the peripheryneighbor node list to the peripheryneighbor node history holding unit 140, and holds this as history. Thus, determination can be made in the peripheryneighbor node managing unit 150 as to whether or not the node is a node which has appeared in the past.

The timing unit 160 is a timer which times the time intervals of the above-mentioned predetermined times whereby the peripheryneighbor node managing unit 150 references the peripheryneighbor node managing unit 150 and notifies the peripheryneighbor node managing unit 150. Note that the predetermined time is assumed to be approximately one second, for example. By lengthening this predetermined time, this may be applicable to a wireless network such as that with packet loss as well. On the other hand, by shortening the predetermined time, changes to topology can be reflected in a sensitive manner.

The display control unit 170 displays information relating to each peripheryneighbor node on the display unit 180, based on the number of hops included in the peripheryneighbor node list supplied from the peripheryneighbor node managing unit 150. In this event, the display control unit 170 can arrange the order of the peripheryneighbor node list in the order of smallest number of hops, for example. Also, the display control unit 170 can narrow down the peripheryneighbor node list based on the number of hops or attribute information of a user with each peripheryneighbor node. Such attribute information may be the current location of the peripheryneighbor node, for example, or may be user preferences (favorite artist, favorite travel destinations, and the like). The current location can be obtained by employing a GPS (Global Positioning System) or response times as to wireless communication. Also, an application which sets user attribute information can be executed at each wireless communication device. The user can appropriately set his/her own attribute information by logging in via the application.

The display unit 180 is a display to perform displaying according to control by the display control unit 170, and is realized with an LCD (Liquid Crystal Display) or the like, for example.

Figure 3:
FIG. 3 is a diagram illustrating a field configuration example of a peripheryneighbor node table 130 according to an embodiment of the present invention.

FIG. 3 is a diagram illustrating a field configuration example of the peripheryneighbor node table 130 according to an embodiment of the present invention. The peripheryneighbor node table 130 holds the fields of node address 131, user identifier 132, and number of hops 133 for each peripheryneighbor node, as the peripheryneighbor node list.

The node address 131 is a field to hold the address for specifying the corresponding peripheryneighbor node. For this address, a MAC (Media Access Control) address or an IP (Internet Protocol) address, for example, may be employed.

The user identifier 132 is a field to hold the identifier to identify a user for the corresponding peripheryneighbor node. The user identifier 132 makes up a portion of the above-described attribute information. The attribute information other than the user identifier may be held in another unshown table, or may be held as a field of a portion of the peripheryneighbor node table 130.

The number of hops 133 is a field to hold the number of hops from the corresponding peripheryneighbor node until arriving at the wireless communication device 100. This example is based on the connection relation with the other wireless communication devices as seen from the wireless communication device 310(A) in FIG. 1, and indicates "1" hop from the wireless communication devices 320(B), 330(C), and 340(D), "2" hops from the wireless communication devices 350(E) and 360(F), and "3" hops from the wireless communication device 370(G).

Figure 4:
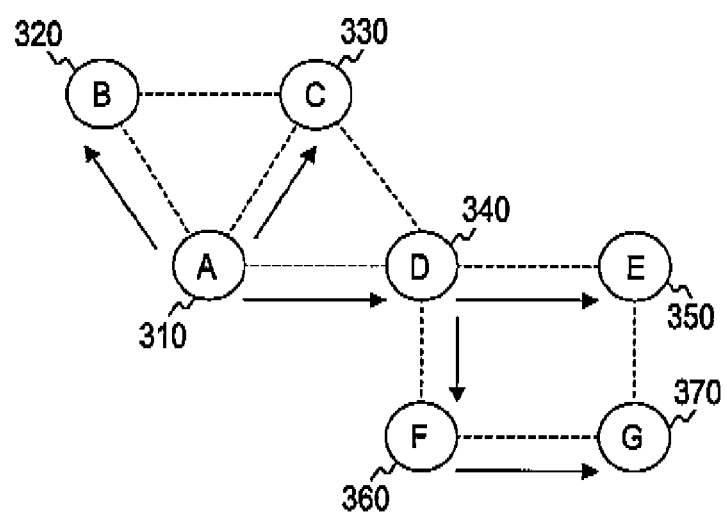
FIG. 4 is a diagram illustrating a situation whereby a node information notification message is transmitted according to an embodiment of the present invention.

FIG. 4 is a diagram illustrating a situation whereby a node information notification message is transmitted according to an embodiment of the present invention. As described above, with a mesh network, each wireless notification device sends a node information notification message to indicate its own existence. This diagram shows a situation wherein a node information notification message from the wireless communication device 310(A) is transmitted.

First, the wireless communication device 310(A) broadcasts a node information notification message with itself as the transmission origin. Thus, the node information notification message arrives at the wireless communication devices 320(B), 330(C), and 340(D), which are directly communicable with the wireless communication device 310(A), with one hop.

Next, the wireless communication device 340(D) transfers the node information notification message from the wireless communication device 310(A) as a relay station. Thus, the node information notification message thereof arrives at the wireless communication devices 350(E) and 360(F). The wireless communication device 360(F) having received this then transfers the node information notification message from the wireless communication device 310(A) as a relay station. Thus, the node information notification message arrives at the wireless communication device 370(G). Thus, the node information notification message is transmitted to the entire mesh network by flooding.

Figure 5:
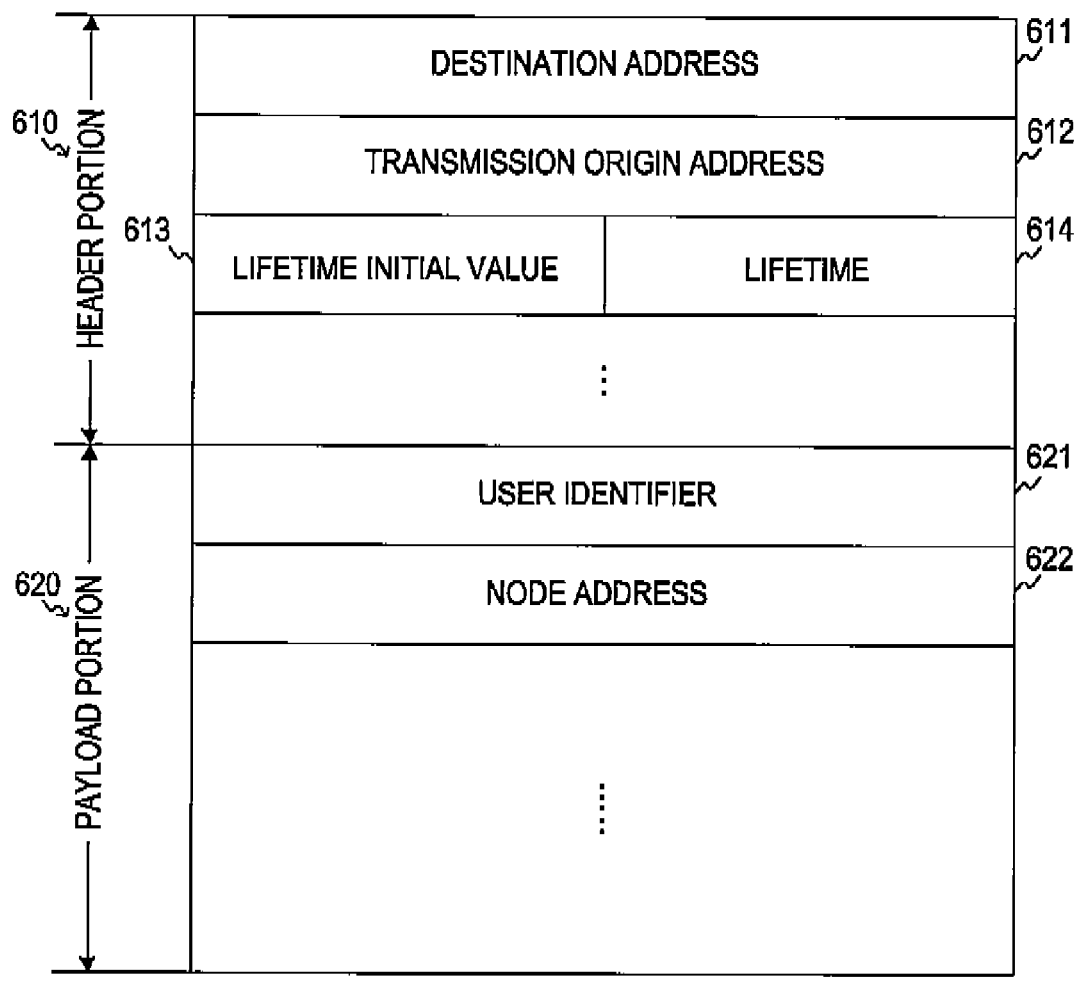
FIG. 5 is a diagram illustrating a configuration example of a node information notification message according to an embodiment of the present invention.

FIG. 5 is a diagram illustrating a configuration example of a node information notification message according to an embodiment of the present invention. The node information notification message herein has a header portion 610 and a payload portion 620. The header portion 610 includes a destination address 611, transmission origin address 612, lifetime initial value 613, and lifetime 614. Also, the payload portion 620 includes a user identifier 621 and a node address 622.

The destination address 611 is an address to identify the destination of the message, which in the case of the node information notification message indicates a broadcast address. The transmission origin address 612 is an address to identify the transmission origin of the message, which in the example in FIG. 4 indicates the address of the wireless communication device 310(A).

The lifetime initial value 613 is a field showing an initial value first set for the lifetime 614. The lifetime 614 is a field showing a remaining time for a message to exist within the network. Number of hops, for example, may be used as the units of the lifetime initial value 613 and the lifetime 614. For example in the example in FIG. 4, in the case that the wireless communication device 310(A) attempts to limit the lifetime of the node information notification message to three hops, the value "3" is set for the lifetime initial value 613 and the lifetime 614. The wireless communication device 340(D) having received this node information notification message reduces the value "3" of the lifetime 614 by 1, and transfers the node information notification message with the lifetime 614 set with a value "2". However, the value of the lifetime initial value 613 is not changed. Similarly, the wireless communication device 360(F) having received the node information notification message from the wireless communication device 340(D) reduces the value "2" of the lifetime 614 by 1, and transfers the node information notification message with the lifetime 614 set with a value "1". In this case also, the value of the lifetime initial value 613 is not changed. Thus, the value of the lifetime 614 is reduced by one at a time, as controlled so as to not be transferred further once the value becomes "0".

The user identifier 621 is a field to show an identifier to identify a user for the wireless communication device serving as the transmission origin of the node information notification message. The user identifier 621 can be any format as long as the user is expressed, and for example an arbitrary character string may be used.

The node address 622 is a field to show an identifier to identify the wireless communication device serving as the transmission origin of the node information notification message, whereby in the example in FIG. 4 shows the address of the wireless communication device 310(A). For this address, for example a MAC address or an IP address may be employed.

Figure 6:
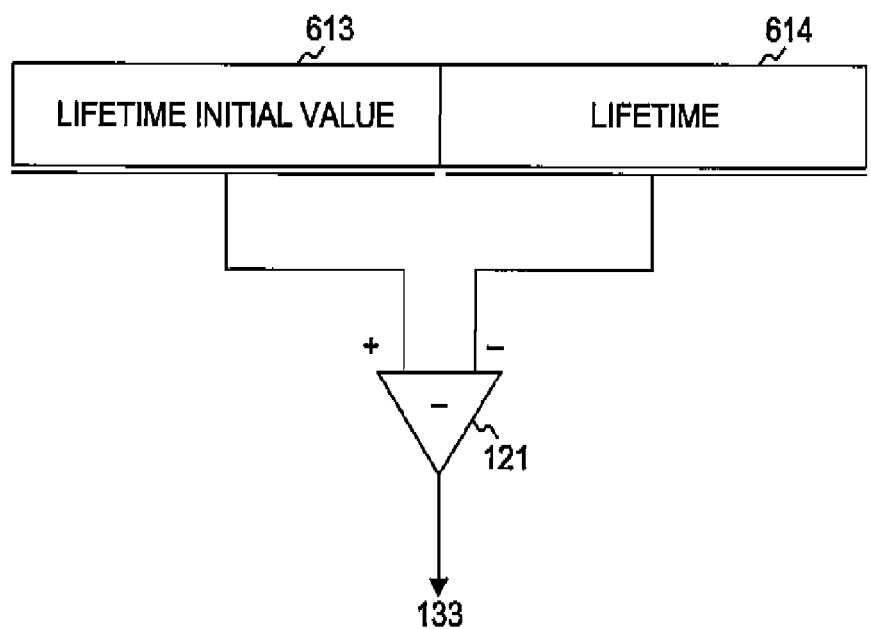
FIG. 6 is a diagram illustrating an example of computing the number of hops with a communication control unit 120 according to an embodiment of the present invention.

FIG. 6 is a diagram illustrating an example of computing the number of hops with a communication control unit 120 according to an embodiment of the present invention. The wireless communication device having received the above-described node information notification message computes the number of tops from the transmission origin with the following Expression, based on the node information notification message thereof.

Number of hops=lifetime initial value−lifetime

That is to say, the communication control unit 120 has a subtractor 121 as shown in the same diagram, and computes the number of hops by subtracting the lifetime 614 from the lifetime initial value 613 of the node information notification message. The number of hops thus computed is held as the number of hops 133 in the peripheryneighbor node table 130.

Note that here the above Expression is employed with the assumption that the lifetime is reduced each time a transfer is performed between wireless communication devices, but in a supposed case wherein a method is employed for the lifetime to be added with each transfer, a similar value can be obtained by subtracting the lifetime initial value from the lifetime.

Figure 7:
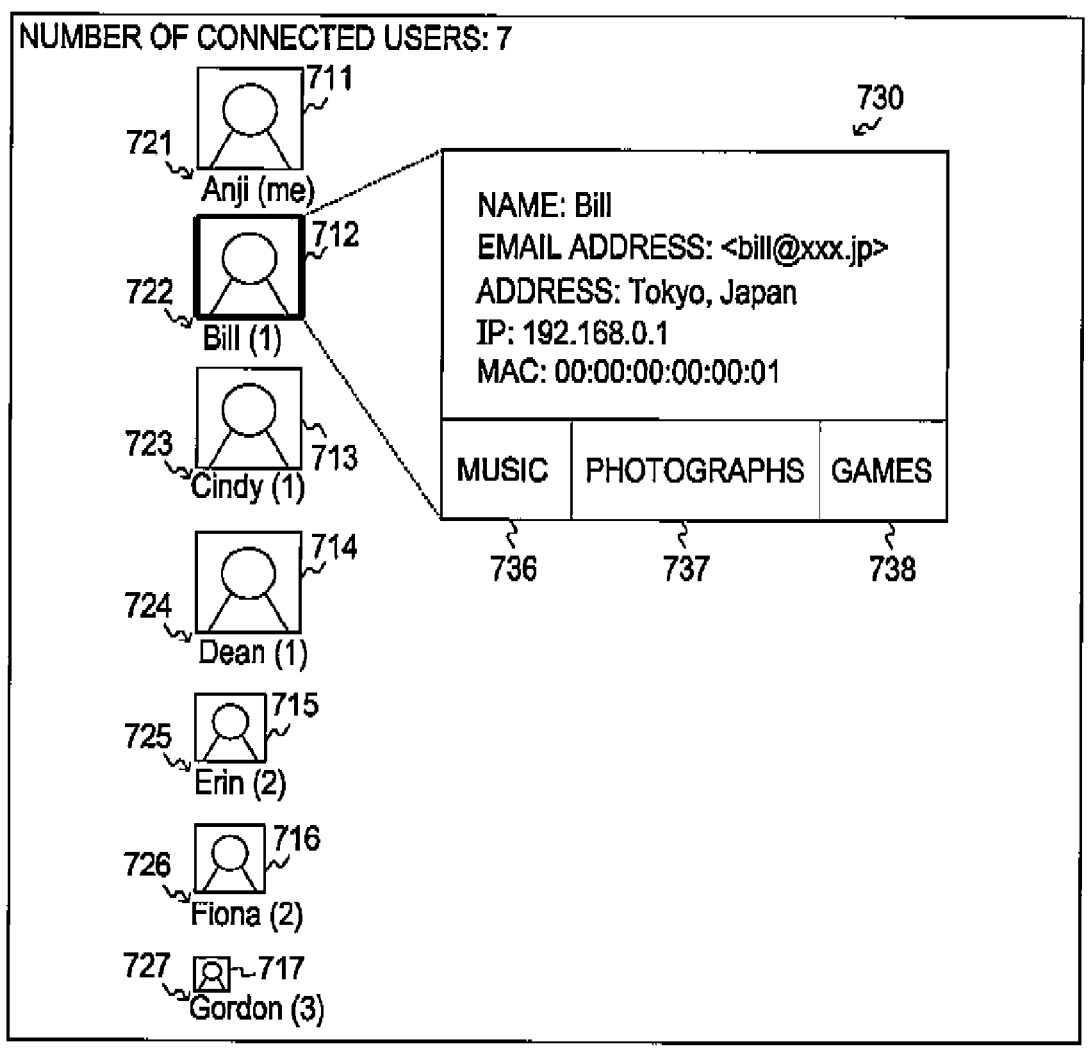
FIG. 7 is a diagram illustrating a display example of information relating to a wireless communication device based on the number of hops according to an embodiment of the present invention.

FIG. 7 is a diagram illustrating a display example of information relating to a wireless communication device based on the number of hops according to an embodiment of the present invention. With this display example, an icon indicating the user of the peripheryneighbor node is displayed in a size according to the number of hops thereof. Here, a display image is shown with the wireless communication device 310(A) in FIG. 1. Accordingly, the number of peripheryneighbor nodes in the mesh network, i.e. the number of connected users, is "7" including itself.

At the top of the icon, an icon 711 for the wireless communication device 310(A) is displayed along with a user name 721. Thereunder the icons 712 through 714 of the wireless communication devices 320(B), 330(C), and 340(D) indicating "1" as the number of hops is displayed along with user names 722 through 724.

Also, thereunder the icons 715 and 716 of the wireless communication devices 350(E) and 360(F) indicating "2" as the number of hops is displayed along with user names 725 and 726. The icons 715 and 710 in the case are displayed smaller than the size of the icons 712 through 714.

Similarly, the icon 717 of the wireless communication device 370(G) indicating "3" as the number of hops is displayed along with the user name 727. The icon 717 is displayed even smaller than the size of the icons 715 and 716.

Thus, with this example, since the icon is displayed larger corresponding to the smaller the number of hops, the distance on the network between each wireless communication device can be intuitively understood by one viewing the display. Note that the numbers of hops are listed in parentheses by each user name 722 through 727, whereby specific values of the number of hops can be known as needed. Note that description has been given here regarding an example wherein the smaller the number of hops is the larger the icon is, but depending on the situation, the reverse situation may be arranged wherein the larger the number of hops is, the larger the icon is displayed.

Also, the icons 711 through 717 are arranged so as to be selectable by an unshown operation receiving unit, whereby the attribute information 730 of the user corresponding to the icon thereof can be displayed. With this example, the name, email address, physical address, IP address, and MAC address of the user are displayed as attribute information 730. Also, music 736, photos 737, and games 738 for the user can also by displayed. When one of these is selected, a list of music, photos, or games belonging to the user is displayed. Note that the frames for the icons 711 through 717 may be arranged to have a particular color for each user.

Also, as described above, the peripheryneighbor node can be further narrowed down by attribute information in the display control unit 170. Thus, for example, searching for a person at a concert venue having the same interests can be performed.

Figure 8:
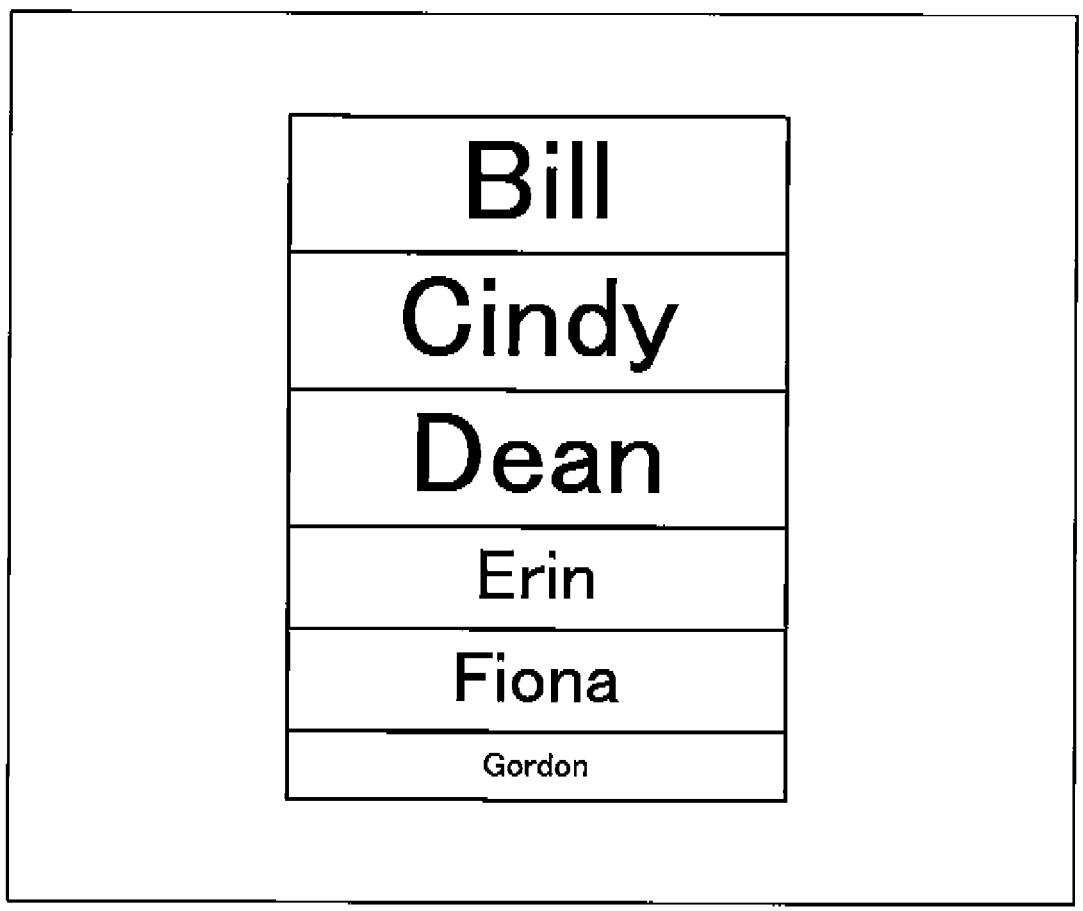
FIG. 8 is a diagram illustrating another display example of information relating to a wireless communication device based on the number of hops according to an embodiment of the present invention.

FIG. 8 is a diagram illustrating another display example of information relating to a wireless communication device based on the number of hops according to an embodiment of the present invention. With this display example, a user name of a peripheryneighbor node in the mesh network is displayed, and the display is arranged such that the smaller the number of hops is, the larger the display is shown.

That is to say, the user names for wireless communication devices 320(B), 330(C), and 340(D) indicating "1" hop are displayed the largest, the user names for wireless communication devices 350(E) and 360(F) indicating "2" hops are displayed mid-sized, the user name for the wireless communication device 370(G) indicating "3" hops is displayed the smallest.

Thus, with this example, since the user names are displayed larger corresponding to the number of hops being smaller, the distance within the network between the various wireless communication devices can be intuitively understood by one viewing the display. Note that description has been given here regarding an example wherein the smaller the number of hops is the larger the user name is displayed, but depending on the situation, the reverse situation may be arranged wherein the larger the number of hops is, the larger the user name is displayed.

Note that with this example, display of the user name of the wireless communication device 310(A) itself is omitted.

Figure 9:
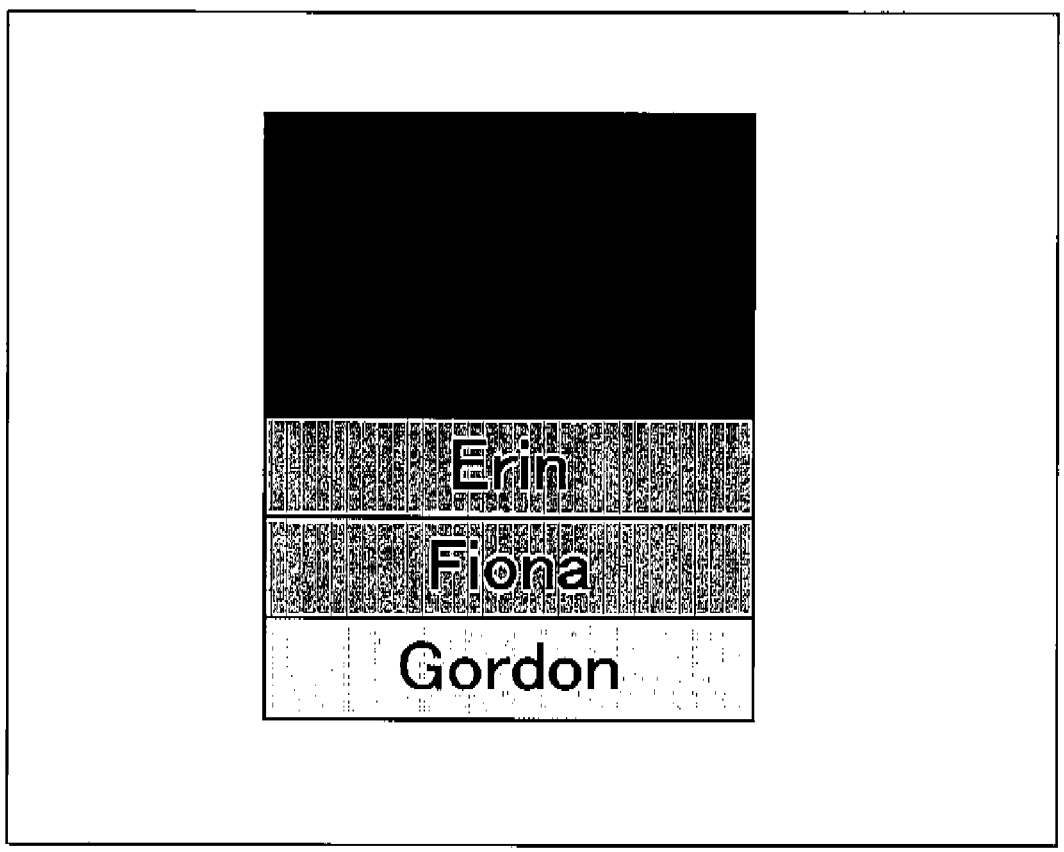
FIG. 9 is a diagram illustrating yet another display example of information relating to a wireless communication device based on the number of hops according to an embodiment of the present invention.

FIG. 9 is a diagram illustrating yet another display example of information relating to a wireless communication device based on the number of hops according to an embodiment of the present invention. With this display example, the user name of a peripheryneighbor node in a mesh network is displayed along with a background, and the background thereof is arranged so as to be darker as the number of hops is smaller. This background may be in color or may be grayscale. Also, the number of hops does not need to be proportional to the darkness, but rather those with the same number of hops having the same darkness is sufficient.

With this example, the backgrounds of the user name are displayed so as to differ according to the corresponding number of hops, whereby the distance within the network between the various wireless communication devices can be intuitively understood by one viewing the display.

Note that with this example also, display of the user name of the wireless communication device 310(A) itself is omitted.

Next, the operation of the various wireless communication devices according to an embodiment of the present invention will be described with reference to the diagrams.

Figure 10:
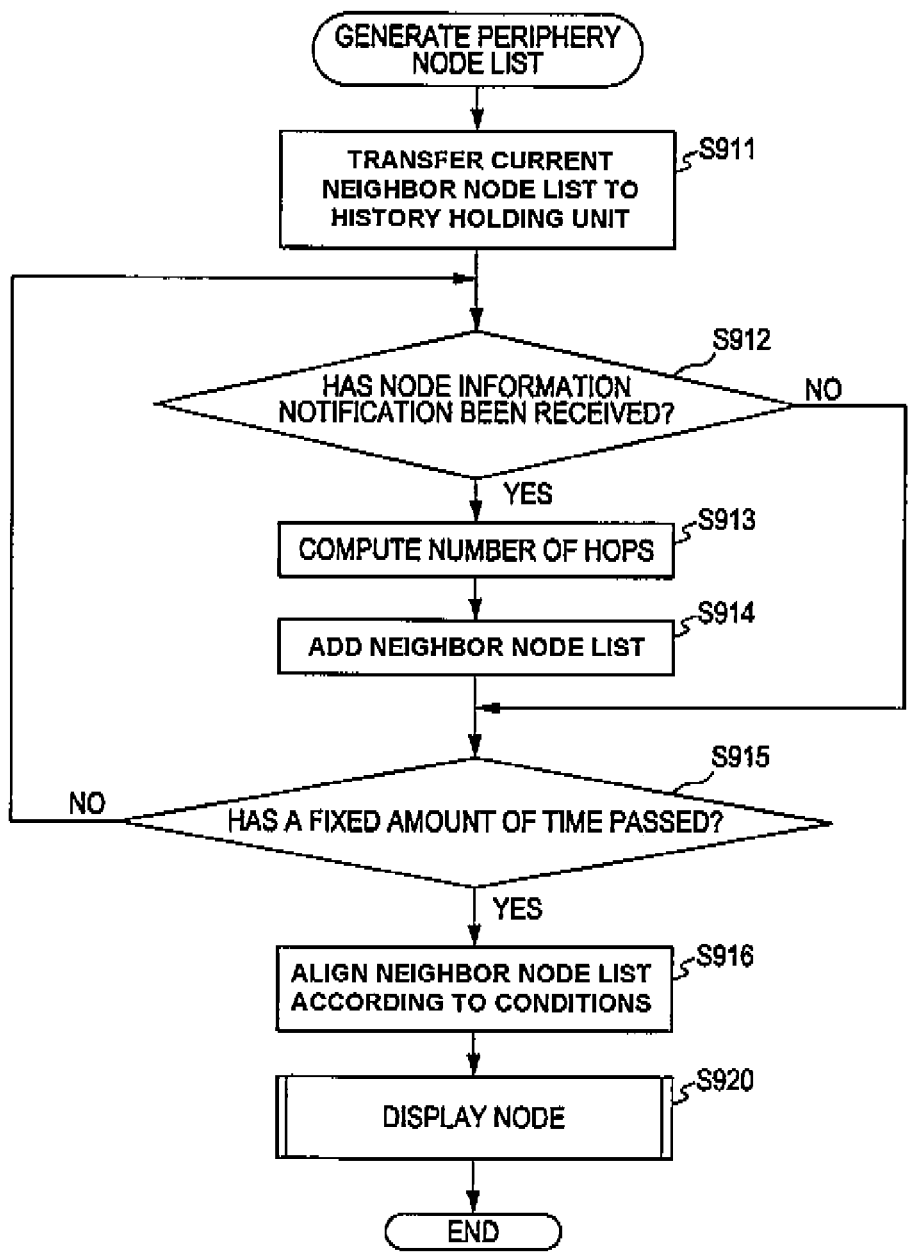
FIG. 10 is a flowchart illustrating a procedure example for processing to generate a peripheryneighbor node list according to an embodiment of the present invention.

FIG. 10 is a flowchart illustrating a procedure example for processing to generate a peripheryneighbor node list according to an embodiment of the present invention. The communication control unit 120 moves the peripheryneighbor node list held in the peripheryneighbor node table 130 to the peripheryneighbor node history holding unit 140 before generating a new peripheryneighbor node list (step S911).

Upon receiving a node information notification message (step S912), the communication control unit 120 computes the number of hops from the lifetime initial value 613 and lifetime 614 of the node information notification message (step S913). The communication control unit 120 adds the number of computed hops and the user identifier 621 and node address 622 of the node information notification message to the peripheryneighbor node table 130 as a peripheryneighbor node list (step S914). This process is repeated until a predetermined time is reached by the timing unit 160 (step S915).

Each time the predetermined time passes, the peripheryneighbor node list held in the peripheryneighbor node table 130 is supplied to the display control unit 170 from the peripheryneighbor node managing unit 150. In this event, the display control unit 170 arranges the order of the peripheryneighbor node list in the order of small numbers of hops, for example (step S916). Also, at this time, narrowing down of the peripheryneighbor node list based on the current location or user attribute information can be performed as well. The display control unit 170 displays information relating to the peripheryneighbor node based on the peripheryneighbor node list (step S920).

Figure 11:
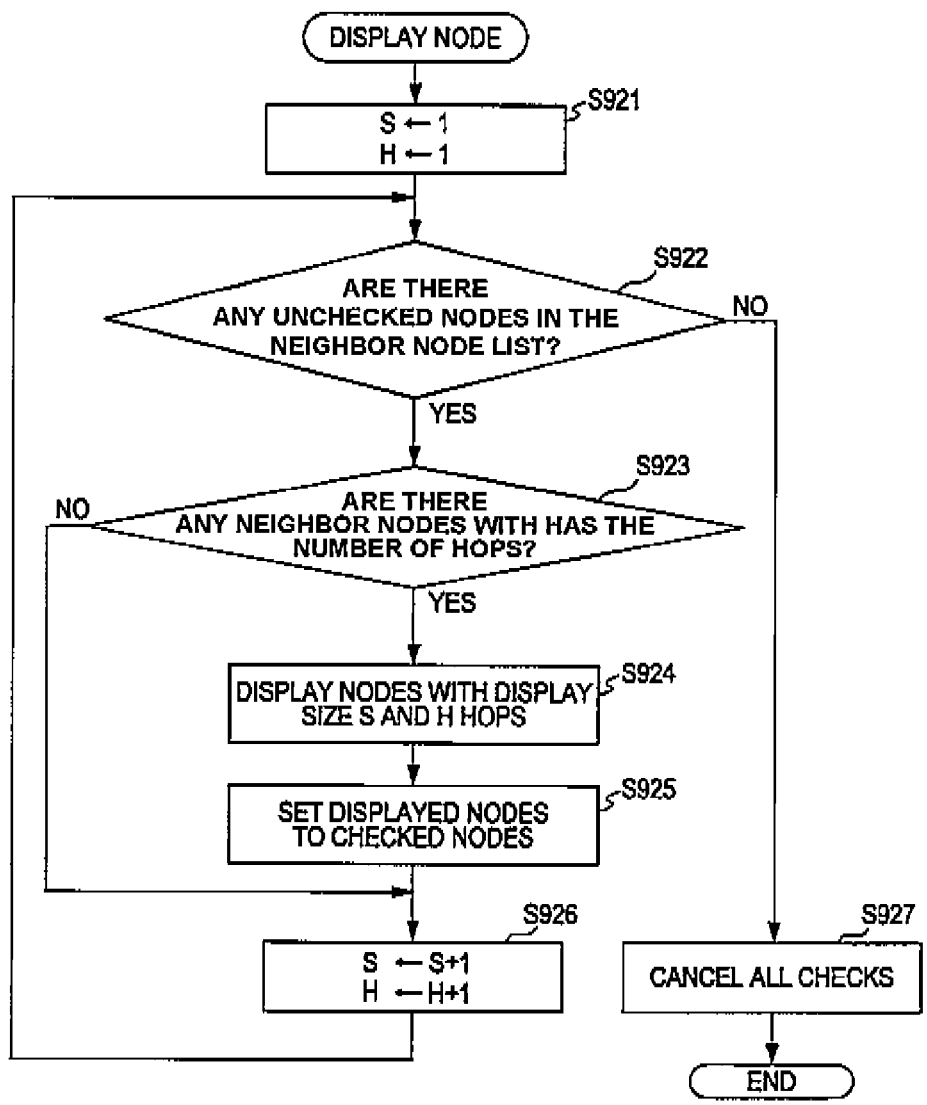
FIG. 11 is a flowchart illustrating a procedure example of peripheryneighbor node display processing (step S920) according to an embodiment of the present invention.

FIG. 11 is a flowchart illustrating a procedure example of peripheryneighbor node display processing (step S920) according to an embodiment of the present invention. With this example, an example is described wherein the attribute information is displayed larger corresponding to smaller numbers of hops. Two variables are employed here. A variable S indicates the display size. The variable H indicates the number of hops. Both of these variables are initialized as "1" (step S921).

In the initial state, the variables H and S are "1", whereby the display control unit 170 researches whether or not there is a peripheryneighbor node in a peripheryneighbor node list which has "1" number of hops (step S923), and in the case that an applicable peripheryneighbor node exists, information relating to the peripheryneighbor node is displayed with a display size which is the largest (step S924). An unshown flag indicated already checked is set on the peripheryneighbor node which is a display object (step S925).

Thereafter, the variables H and S are each increased by 1 (step S926), after which the above-described processing for a peripheryneighbor node wherein the number of hops is "2" is performed (steps S923 through 926). After these processes are repeated, upon all peripheryneighbor nodes having been checked (step S922), all check flags are cleared (step S927), and the peripheryneighbor node display processing is ended.

Thus, according to an embodiment of the present invention, information relating to the peripheryneighbor nodes can be displayed on the display unit 180, according to the size or background according to the number of hops of corresponding peripheryneighbor node, based on the peripheryneighbor node list held in the peripheryneighbor node table 130. Thus, even in the case that topology of the mesh network becomes complex, the state of the network can be displayed in a simple manner from the viewpoint of number of hops. In many cases, the topology of the mesh network is not important for an application, and the distance of the network shown by number of hops is often sufficient for application to a network service and so forth. The smaller the number of hops, the closer the user feels, and since communication quality is higher, communication can be performed in a sure manner.

As a specific application example of the embodiment according to the present invention, an application such as a social network service (SNS) in a virtual space or instant messaging may be used.

Note that with the embodiment according to the present invention, the display of the size and background is changed according to the number of hops, but other than number of hops, link quality and so forth may be considered to change the display method. For example, an arrangement may be made wherein information relating to a peripheryneighbor node with good link quality is displayed to be large, and information relating to a peripheryneighbor node with poor link quality is displayed to be small.

Next, description will be given for an arrangement for information sharing with a wireless communication device such as that described above. Generally, in the case of sharing still images (photographs) or moving images among users, interaction is made employing volatile memory or storage media, or by email or a website via the Internet. In the case of either method, an arrangement is necessary to exchange images after a certain amount of time has passed after photographing.

With the introduction of a camera having a networking function, the desire to exchange photographs in an ad hoc manner has increased. However, even if an exchange is attempted employing a wireless LAN or the like when imaging is performed, with a limited user interface of the camera, specifying a partner or selecting a photograph or moving image can be difficult. Also, exchanging photographs by moving the cameras close together immediately after photographing to specify the partner may be a method to employ, but photograph selection is cumbersome, and timing for the exchange is also difficult.

On the other hand, a method to synchronize the photographs one another has photographed immediately after imaging, by setting the mutual cameras to share all photographs from the beginning, may be another method, but there may be the problem of privacy, so always sharing photographs between friends is a rare case. Also, if the settings are made, an arrangement to always clear such settings also becomes necessary. Further, in the case of sharing all photographs, there is the problem of expending network resources. An arrangement is needed wherein photographs can be shared simply without complicated settings, and automatically, while deleting photographs wherein the photography has failed. Accordingly, an arrangement for sharing images between wireless communication devices will be described below.

Figure 12:
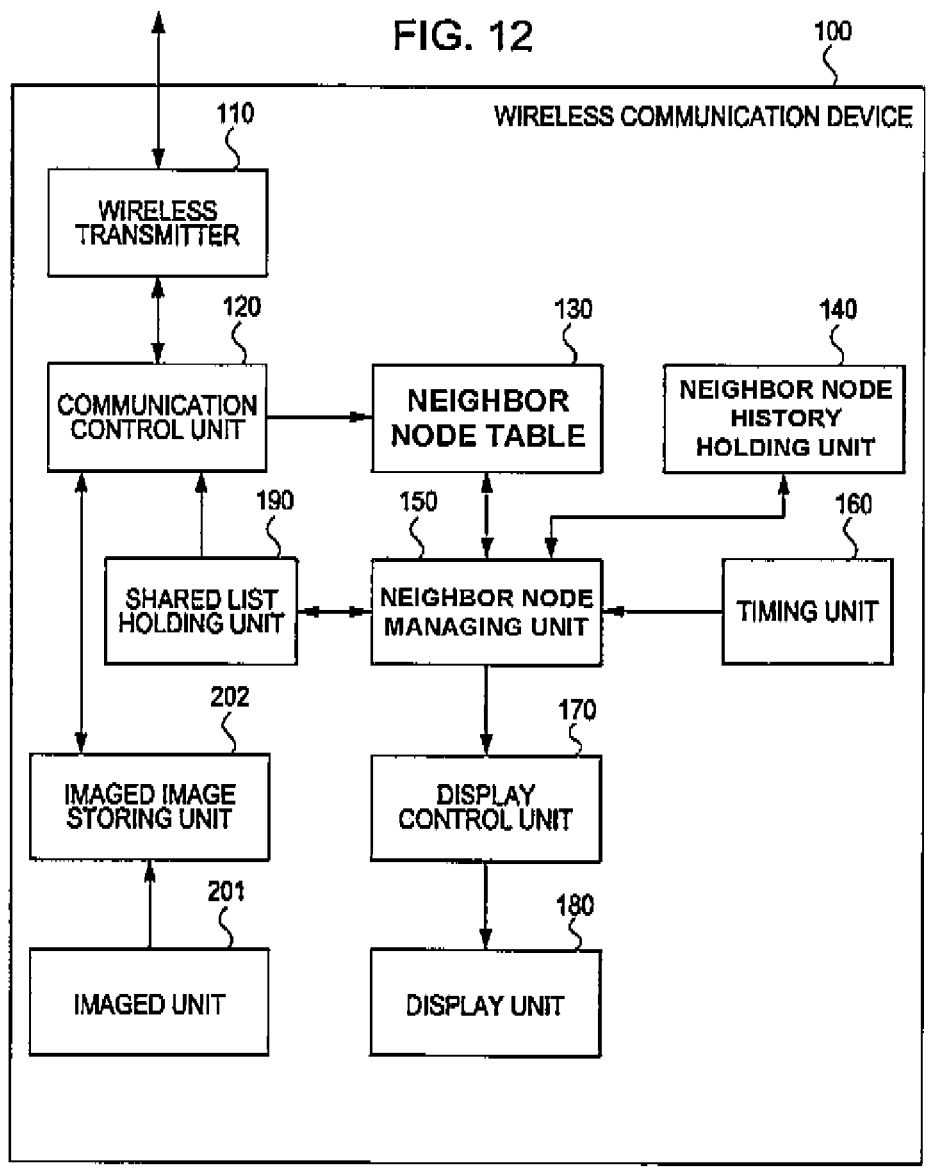
FIG. 12 is a diagram illustrating a second configuration example of the wireless communication device 100 according to an embodiment of the present invention.

FIG. 12 is a diagram illustrating a second configuration example of the wireless communication device 100 according to an embodiment of the present invention. The wireless communication device 100 further has a shared list holding unit 190 and imaging unit 201, imaged image storing unit 202, in addition to the first configuration example described with reference to FIG. 2.

The shared list holding unit 190 holds information relating to other wireless communication devices sharing images, as a shared list. This shared list is managed with the peripheryneighbor node managing unit 150. The communication control unit 120 performs image synchronizing processing by referencing the shared list herein. Note that the content of the shared list will be described later.

The imaging unit 201 is a camera to image a still image or a moving image. The images which are imaged by the imaging unit 201 are stored in the imaged image storage unit 202. The imaged image storage unit 202 can be realized as a specific folder on a file system in the wireless communication device 100. At least a portion of the file names for each imaged image is provided with a continuous numbering in the order of being imaged. The state of an imaged image being transferred to the folder of the partner wireless communication device is expressed as "sharing".

Figure 13:
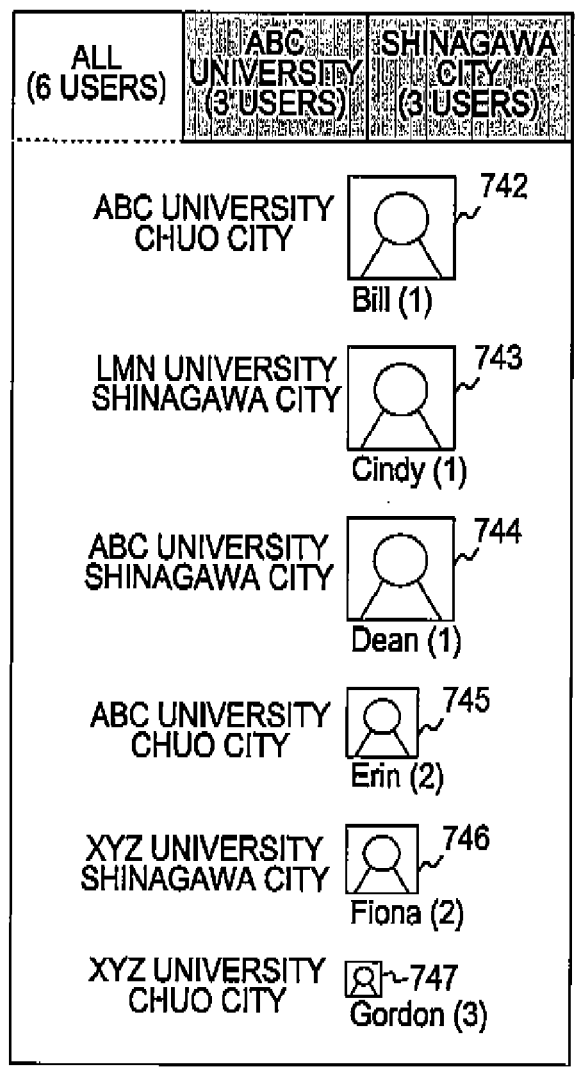
FIG. 13 is a diagram illustrating another display example of information relating to a wireless communication device based on the number of hops according to an embodiment of the present invention.

FIG. 13 is a diagram illustrating another display example of information relating to a wireless communication device based on the number of hops according to an embodiment of the present invention. With this display example, similar to that in FIG. 7, the icons indicating the users of the periphery-neighbor nodes are displayed by size according to the number of hops. On the left side of the icons are displayed the university name or address (city name) as attributes of each user. Note that the content of attribute information may be other than these.

This display example is an example to automatically perform selection with tabs, and tabs are assigned here in the three categories of "all", "ABC University", "Shinagawa City". These category tabs may be arranged to be automatically created with the same attributes as the user of the wireless communication device 100, and may be arbitrarily created by user.

Figure 14:
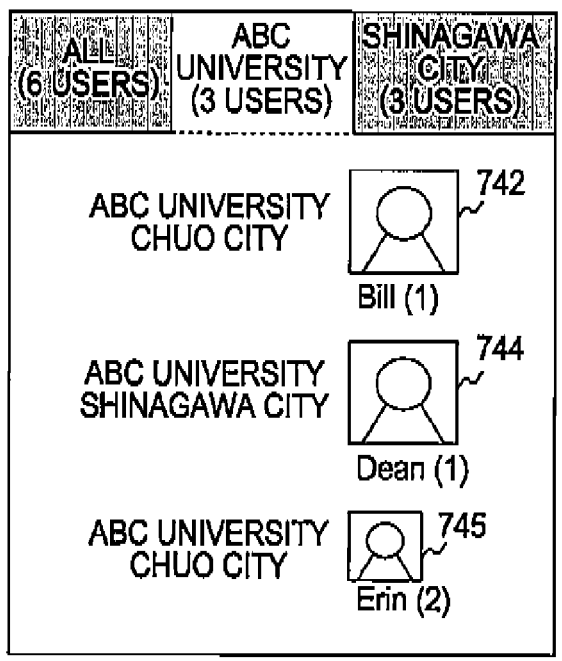
FIG. 14 is a diagram illustrating yet another display example of information relating to a wireless communication device based on the number of hops according to an embodiment of the present invention.

FIG. 13 is a display example in the event that the "all" tab is selected, and FIG. 14 is a display example in the event that the "ABC University" tab is selected. Thus, by selecting a tab, users matching the criteria (i.e. friends with similar preferences) can be displayed.

Figure 15:
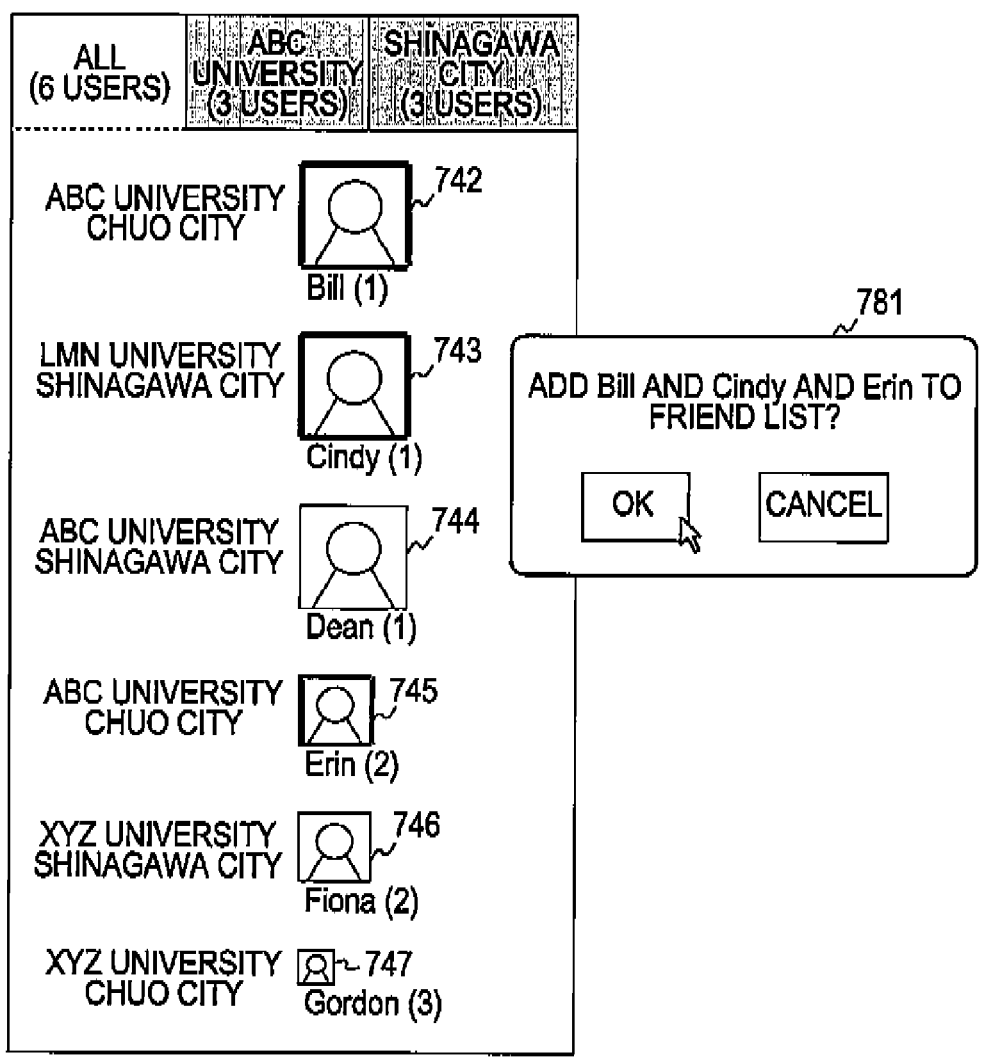
FIG. 15 is a diagram illustrating a display example in the event of creating a friend list according to an embodiment of the present invention.

FIG. 15 is a diagram illustrating a display example in the event of creating a friend list according to an embodiment of the present invention. With the display screen in FIG. 13, for example in a state wherein the icons 742, 743, and 745 are selected if the registration instruction operation (e.g. right click) is performed, a dialog box 781 is displayed, and registration confirmation is performed. In this event, if "OK" is clicked by the user, the three selected users (Bill, Cindy, Erin) are registered in the friend list.

Figure 16:
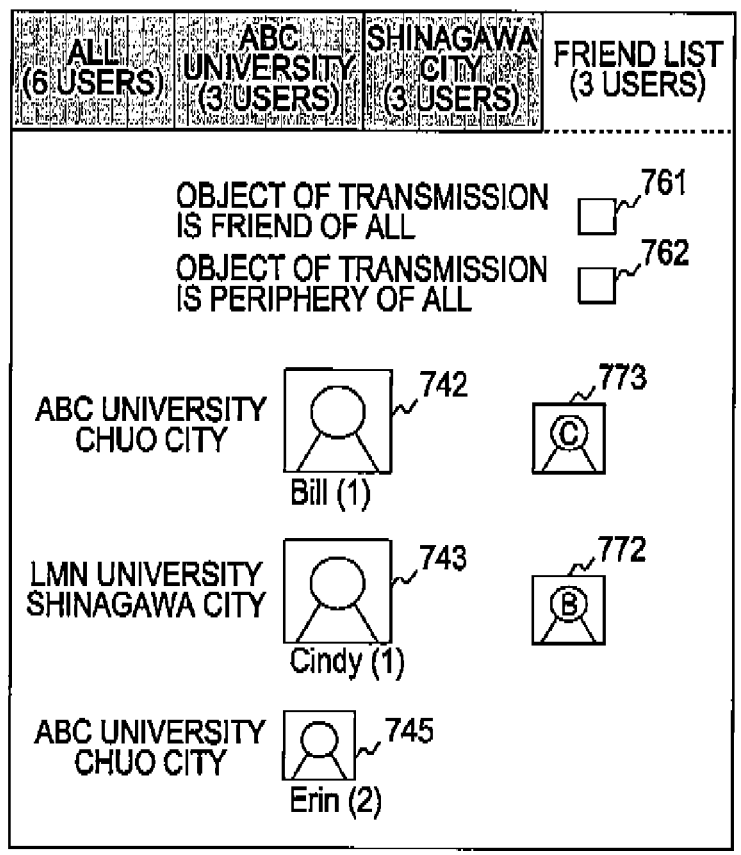
FIG. 16 is a diagram illustrating a display example of a friend list according to an embodiment of the present invention.

FIG. 16 is a diagram illustrating a display example of a friend list according to an embodiment of the present invention. A friend list is created based on the above-described registration instruction operations. The icon 773 indicates that Bill is sharing images with Cindy. Similarly, icon 772 indicates that Cindy is sharing images with Bill.

By selecting a user on this display screen, an invitation can be sent to a potential image sharing partner. The invitation is a message which proposes sharing of imaged images. In order to send an invitation to all users displayed in the friend list, a box 761 is clicked. In order to send an invitation to all periphery-neighbor nodes regardless of the friend list, a box 762 is clicked. In the case of sending an invitation to all periphery-neighbor nodes, broadcasting which does not particularly specify an address (flooding to the entire network with a mesh network) is employed. In all other cases, transmission with an individual uni-cast is performed.

Note that a friend list is displayed as one category, but the display can be made as a friend list independent from a user list.

FIG. 17 is a diagram illustrating another example of a field configuration of the peripheryneighbor node table 130 according to an embodiment of the present invention. The peripheryneighbor node table 130 further holds attribute 134 and friend 135, in addition to the field configuration example in FIG. 3.

Attribute 134 is a field showing the attribute of each user, and a university name and physical address (city name) is displayed in this case. As described above, the content of the attributes may be other than these.

Friend 135 is a field indicating whether or not a user is registered in the friend list. In this example, "1" is entered in the fields corresponding to Bill, Cindy, and Erin, and "0" is entered in the fields corresponding to all other users.

Figures 18, 19:
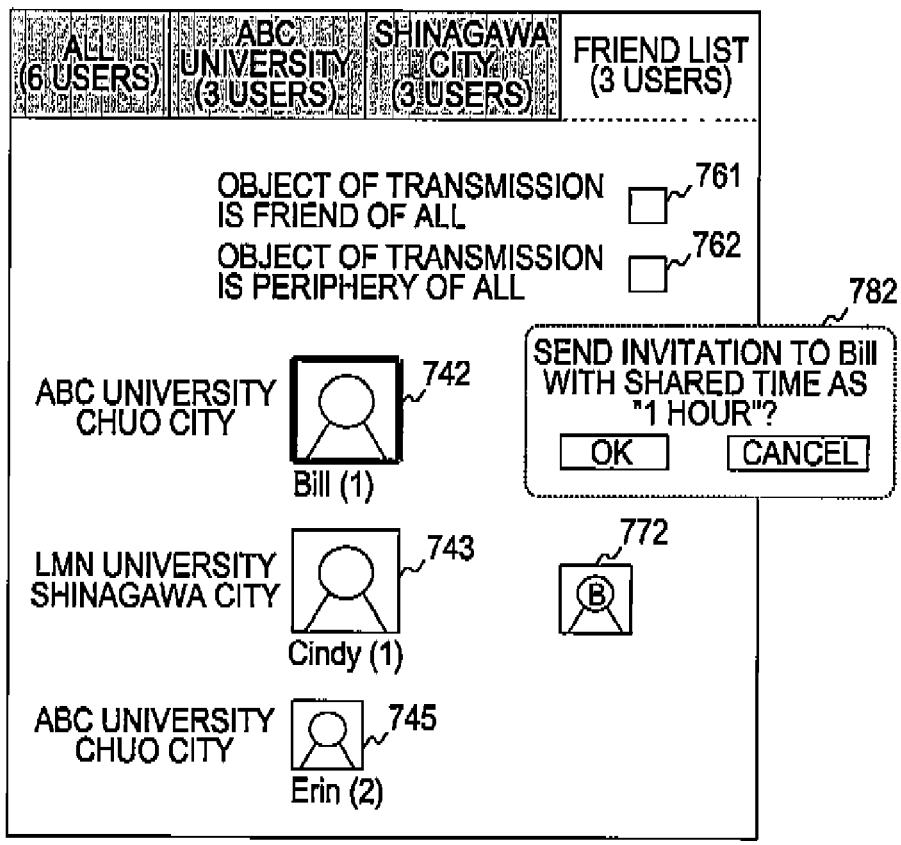
FIG. 18 is a diagram illustrating a display example in the event that a user is selected in a friend list according to an embodiment of the present invention.
FIG. 19 is a diagram illustrating an example of an invitation according to an embodiment of the present invention.

FIG. 18 is a diagram illustrating a display example in the event that a user is selected in a friend list according to an embodiment of the present invention. Upon an invitation transmission instruction operation (e.g. right-click) being performed in a state wherein the icon 742 (Bill) is selected in the display screen in FIG. 16, for example, a dialog box 782 is displayed, whereby invitation transmission confirmation is performed. In this event, if the user clicks on "OK", the invitation is sent to the selected user (Bill). This invitation can be sent in a format such as email, instant messaging, or the like.

In the dialog box 782, "1 hour" is indicated as the sharing time. Thus, the time for sharing images can be set with a limit thereto. This sharing time can be changed by directly correcting the display in the dialog box 782. For example, a method for specifically specifying time as N hours and M minutes, or a method for selecting a timeframe, such as all day today, or all week this week, may be used. If the time is left largely limitless, photographs can be shared almost without limit. In the case of sharing photographs with friends simply at an event such as a party or during a trip, being able to select a timeframe is more useful.

FIG. 19 is a diagram illustrating an example of an invitation according to an embodiment of the present invention. The invitation includes "user B" as the destination address user name, an email address "userB@share.xxx.co.jp" as the identifier to uniquely identify the wireless communication device of the destination user, "user A" as the user name of the sender, an email address "userA@share.xxx.co.jp" as an identifier of the wireless communication device of the sender, "s200701011200" as a message identifier, and "all day today" as the sharing time.

Since there is the possibility of a duplicate user name, the email address is used here as the identifier. Also, the message identifier is employed in the case of receiving a duplicate invitation for one reason or another, so as to discard the duplicate invitation at the receiving side. The sharing time is used for computing the sharing time limit.

FIG. 20 is a diagram illustrating a field configuration example of a shared list held in a shared list holding unit 190 according to an embodiment of the present invention. The shared list has the fields for a sharing user name 191, sharing user identifier 192, IP address 193, sharing time limit 194, and synchronizing-complete image identifier 195.

The sharing user name 191 is a field holding the name of the user. The sharing user name 191 is employed here as a nickname, and the following sharing user identifier 192 is employed to uniquely identify the user.

The sharing user identifier 192 is a field holding the identifier for uniquely identifying a user. The sharing user identifier 192 is desired to guarantee global uniqueness, and as such, an email address is employed here.

The IP address 193 is an address for specifying the wireless communication device used by the user. A MAC address may be employed instead of the IP address. Note that in this example, the correlation between the sharing user identifier 192 and IP address 193 within the shared list is summarized together, but the correlation thereof may be managed separately.

The sharing time limit 194 is a field holding the time limit for sharing images between the users. The sharing time limit 194 is computed based on the shared time in the invitation. For example, in the case that the current time is "Jan. 9, 2007, 14:30", in the case that a "one week worth" time limit invitation is received, the sharing time limit 194 will be set to "Jan. 16, 2007, 14:30". Upon this sharing time limit 194 passing, the sharing state is cancelled. Note that even while in a sharing state, if the power supply is disconnected, the transfer of images is temporarily discontinued.

The synchronizing-complete image identifier 195 is a field holding an identifier of an image wherein synchronization is complete between the corresponding users. As described above, at least a portion of the file name for each imaged image is assigned a consecutive number in order of imaging. That up to the image of the identifier held in the synchronizing-complete image identifier 195 is transferred to the partner wireless communication device (i.e. synchronized) is guaranteed. On the other hand, file names of the newest images out of the images having been imaged are held in the sharing list. By holding the identifiers of the images wherein synchronization is complete in the synchronizing-complete image identifier 195, even in the case that an image was unable to be transferred for some reason such as power disruption or the like, all images are to be sent until the newest-image identifier matches.

Note that the sharing list holding unit 190 is preferably realized with writeable non-volatile memory (e.g. EEPROM or the like) so as to withstand power disruptions.

Figure 21:
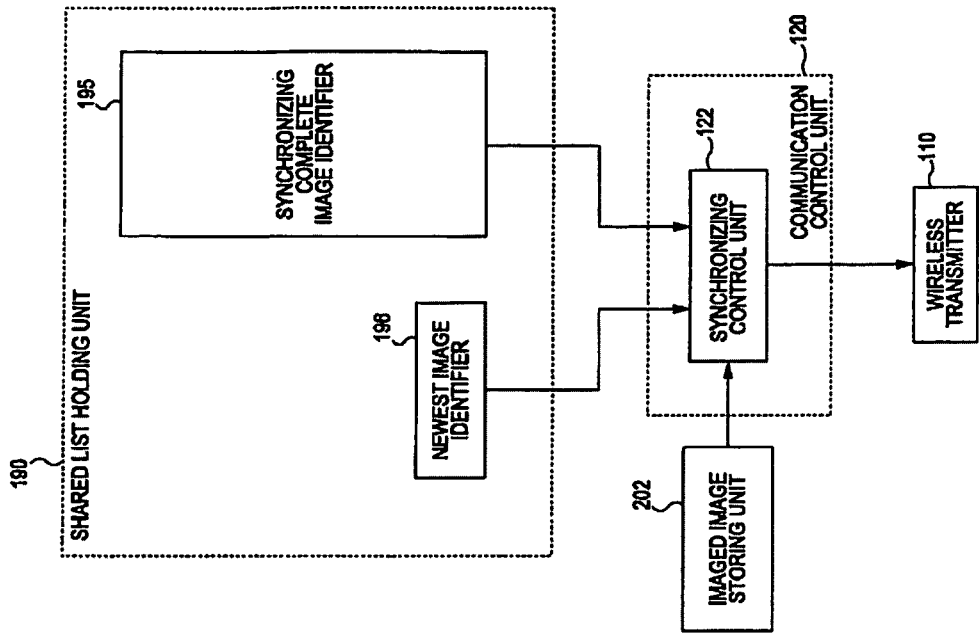
FIG. 21 is a diagram illustrating a configuration example of a synchronizing mechanism according to an embodiment of the present invention.

FIG. 21 is a diagram illustrating a configuration example of a synchronizing mechanism according to an embodiment of the present invention. The sharing list holding unit 190 holds the synchronizing-complete image identifier 195 corresponding to each user, as well as a newest-image identifier 196. Also, the communication control unit 120 has a synchronizing control unit 122 in order to realize the synchronizing with other wireless communication devices.

The synchronizing control unit 122 compares the image identifier for each user held in the synchronizing-complete image identifier 195 and the newest-image identifier held in the newest-image identifier 196, whereby if there are any images not yet transferred, the applicable images are read from the imaged image storage unit 202 and supplied to the wireless transmitter 110. The wireless transmitter 110 transfers the image thereof as to the wireless communication device of the corresponding user. Upon the transfer of the image completing, the image identifier of the synchronizing-complete image identifier 195 is updated.

Figure 22:
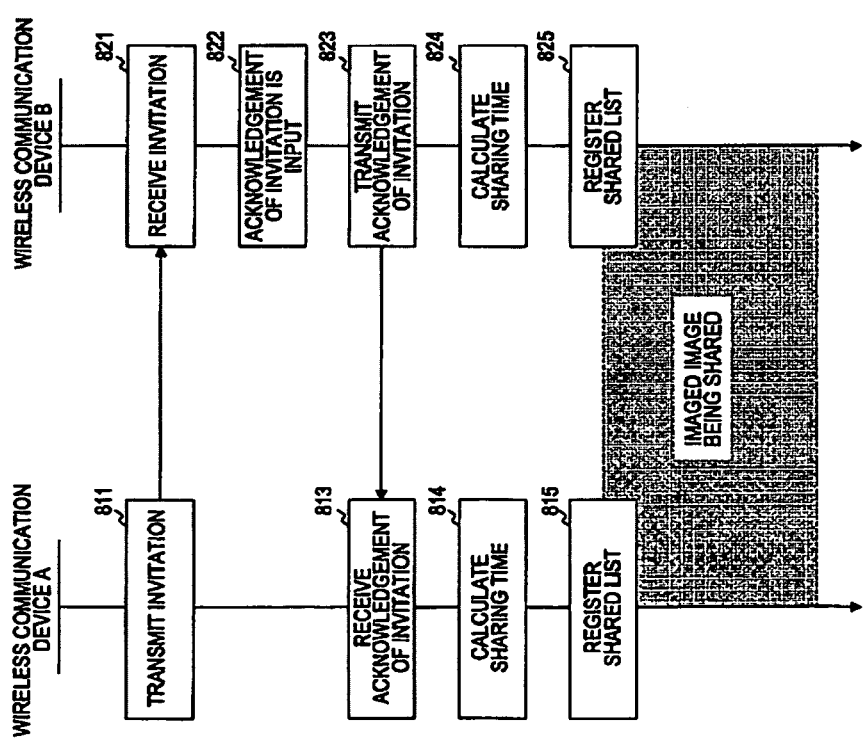
FIG. 22 is a diagram illustrating a sequence chart showing the flow from an invitation transmission to shared list registration according to an embodiment of the present invention.

FIG. 22 is a diagram illustrating a sequence chart showing the flow from an invitation transmission to shared list registration according to an embodiment of the present invention.

First, upon the wireless communication device A sending an invitation addressed to the wireless communication device B (811), the wireless communication device B receives the invitation thereof (821). Upon the user of the wireless communication device B acknowledging the invitation, i.e. inputting permission for image sharing (822), the wireless communication device B sends this fact to the wireless communication device A (823).

Upon receiving acknowledgement from the wireless communication device B (813), the wireless communication device A calculates a sharing time limit based on the sharing time limit on the invitation (814), and registers the entry corresponding to the wireless communication device B in the shared list (815).

On the other hand, the wireless communication device B also calculates the sharing time limit based on the sharing time limit on the invitation (824) and registers the entry corresponding to the wireless communication device A in the shared list (825). Thus, the wireless communication devices A and B are in a state of mutual image sharing.

Figure 23:
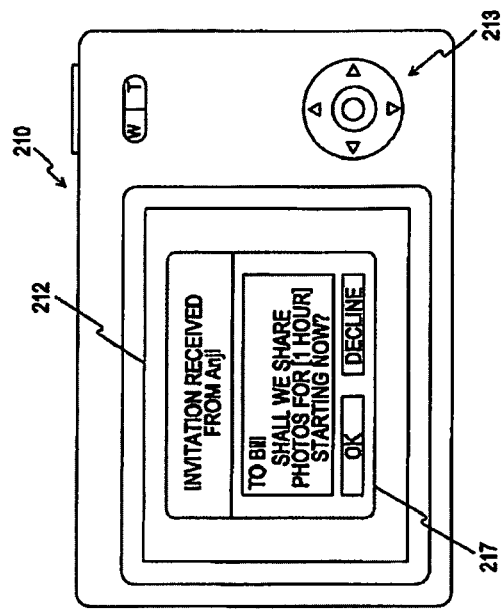
FIG. 23 is a diagram showing a screen display example of a wireless communication device 210 having received an invitation according to an embodiment of the present invention.

FIG. 23 is a diagram showing a screen display example of a wireless communication device 210 having received an invitation according to an embodiment of the present invention. Upon the invitation being received, a dialog box 217 is displayed on the display screen 212 of the wireless communication device 210.

The information that the invitation from another wireless communication device (user name: Anji) has arrived, and the time for sharing images, are shown in the dialog box 217. An arrangement is made such that with a cross button 213, one of the "OK" or "decline" buttons can be selected. Upon "OK" being selected, acknowledgement for the invitation is sent. In the case that "decline" is selected, the invitation is not acknowledged, and image sharing is not performed.

Figure 24:
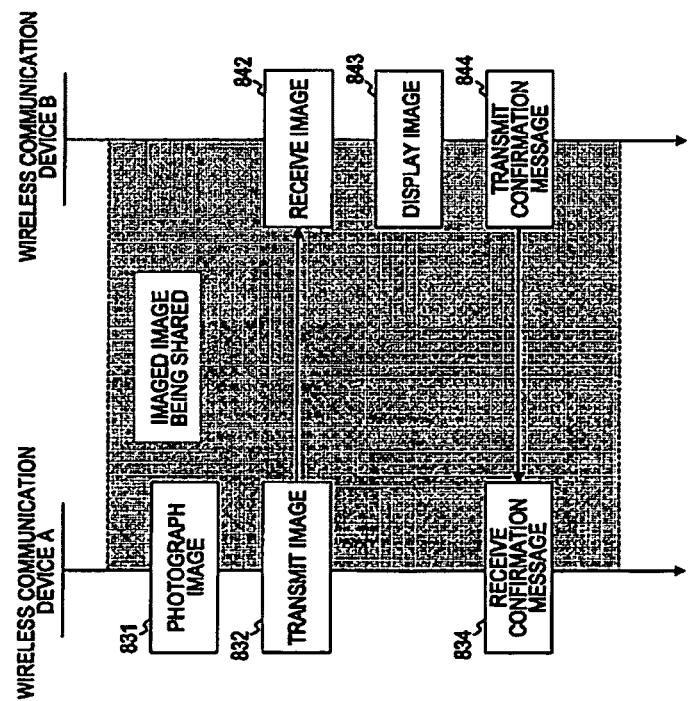
FIG. 24 is a diagram illustrating a sequence chart showing a first example of imaged image transmission according to an embodiment of the present invention.

FIG. 24 is a diagram illustrating a sequence chart showing a first example of imaged image transmission according to an embodiment of the present invention.

During a image sharing state, when an image is imaged with the wireless communication device A (831), the imaged image thereof is sent to the wireless communication device B serving as the sharing partner (832). The partner user identifier is specified and the image is sent with an HTTP (Hyper Text Transfer Protocol) or FTP (File Transfer Protocol), or with an application layer protocol such as instant messaging. Upon the wireless communication device B receiving the imaged image (842), the imaged image thereof is displayed in the display unit (843). Thereafter, upon the image received confirmation message being sent from the wireless communication device B (844), the wireless communication device A receives this (834).

Figure 25:
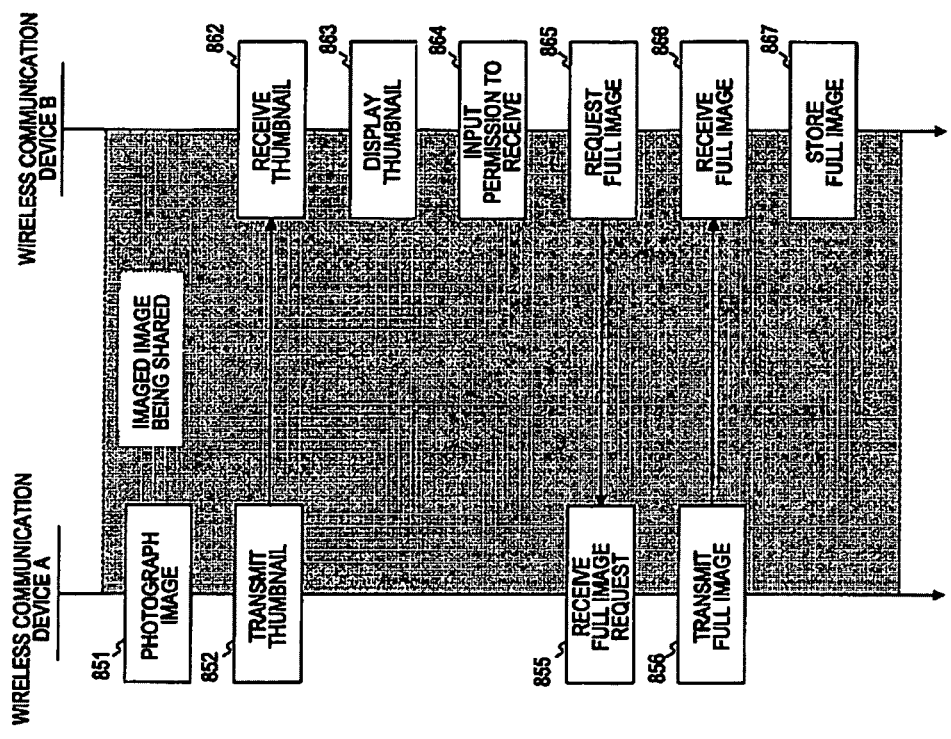
FIG. 25 is a diagram illustrating a sequence chart showing a second example of imaged image transmission according to an embodiment of the present invention.

FIG. 25 is a diagram illustrating a sequence chart showing a second example of imaged image transmission according to an embodiment of the present invention. In the example in FIG. 24, the imaged image is sent as is, but with this second example, a thumbnail image (reduced image) is sent first, and after receiving permission is given, the full image of the imaged image is sent.

When an image is imaged at the wireless communication device A while in an image sharing state (851), a thumbnail image of the imaged image thereof is sent to the wireless communication device B serving as the sharing partner (852).

Upon receiving the thumbnail image (862), the wireless communication device B displays the thumbnail image thereof on the display unit (863). When receiving permission for the image is input by the user (864), the full image of the imaged image is requested to the wireless communication device A (865).

Upon receiving a full image request (855), the wireless communication device A sends the full image of the imaged image to the wireless communication device B (856). Upon receiving the full image of the imaged image (866), the wireless communication device B stores this (867).

FIG. 26 are diagrams illustrating a screen display example in the event that imaging is performed while in an image sharing state according to an embodiment of the present invention. When the shutter button 221 on the wireless communication device 220 is pressed, as shown in FIG. 26A, the imaged image thereof is displayed on the display screen 222, and also a dialog box 228 is displayed. The transmission destination of the imaged image (user name: Cindy) and the time remaining to enable canceling of the transmission is displayed in the dialog box 228. This remaining time is counted down for example with the timing unit 160.

If "cancel" is selected with the cross button 223 before the remaining time reaches 0 seconds, the imaged image is not sent. If the remaining time reaches 0 seconds in a state of "cancel" not being selected, the imaged image is sent. Note that this remaining time can be arbitrarily set, and in the case this is set to 0 seconds, the imaged image is sent unconditionally.

Also, an arrangement may be made wherein the cancelable time is not limited, and the user is constantly requested for confirmation. For example, as shown in FIG. 26B, an arrangement may be made wherein one of "OK" or "cancel" can be selected in the dialog box 229 as to the imaging transmission.

FIG. 27 is a diagram illustrating a screen display example in the event that an image is received while in an image sharing state according to an embodiment of the present invention. As described with FIG. 25, an example is assumed herein wherein a thumbnail image is sent first. Note that with this display example, the icon 238 of the partner while in the image-sharing state is displayed.

Upon receiving the thumbnail image at the wireless communication device 230, a dialog box 239 is displayed on the display screen 232. The transmission destination of the imaged image (user name: Anji) and the time remaining to cancel reception of the full image is displayed in the dialog box 239. This remaining time is counted down for example with the timing unit 160.

If "decline" is selected with the cross button 223 before the remaining time reaches 0 seconds, the full image of the imaged image is not sent from the partner. If the remaining time reaches 0 seconds in a state of "decline" not being selected, the full image of the imaged image is sent from the partner. Note that this remaining time can be arbitrarily set, and in the case this is set to 0 seconds, the full image of the imaged image, following the thumbnail image, is sent from the partner.

Figure 28:
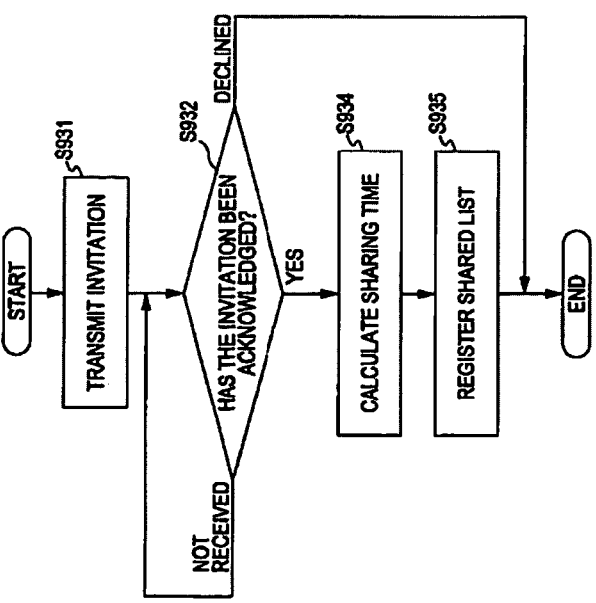
FIG. 28 is a flowchart illustrating a procedure example of invitation transmission processing according to an embodiment of the present invention.

FIG. 28 is a flowchart illustrating a procedure example of invitation transmission processing according to an embodiment of the present invention. Upon sending an invitation (step S931), the wireless communication device awaits an invitation receipt from the partner wireless communication device.

When the invitation is accepted (step S932), the sharing time limit is computed based on the invitation (step S934), and the entry corresponding to the partner wireless communication device is registered in the shared list (step S935). This enables the state of image sharing.

On the other hand, if acceptance of the invitation is declined (step S932), the processing is ended without being in an image sharing state.

Figure 29:
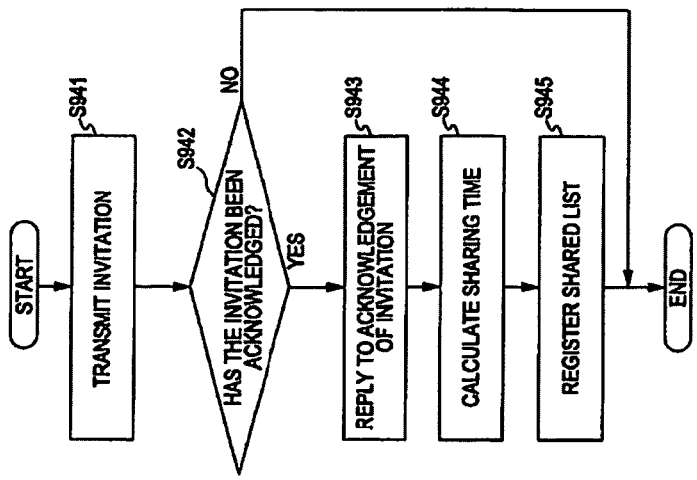
FIG. 29 is a flowchart illustrating a procedure example of invitation receiving processing according to an embodiment of the present invention.

FIG. 29 is a flowchart illustrating a procedure example of invitation receiving processing according to an embodiment of the present invention. Upon receiving an invitation (step S941), the wireless communication device awaits input from the user as to whether the invitation will be accepted or not.

When acceptance of the invitation is input (step S942), a reply of invitation acceptance is sent as to the partner wireless communication device (step S943). Also, the sharing time limit is calculated based on the invitation (step S944), and the entry corresponding to the partner wireless communication device is registered in the shared list (step S945). This enables the state of image sharing.

On the other hand, if acceptance of the invitation is declined (step S942), the processing is ended without being in an image sharing state.

FIG. 30 is a flowchart illustrating a first procedure example of processing during imaging of an image according to an embodiment of the present invention. This procedure example equates to the processing (832) of the wireless communication device A in FIG. 24.

In the event that an image is imaged with the wireless communication device (step S951), if there are any users registered in the shared list (step S952), the registered users therein are selected sequentially (step S953).

If the sharing time limit 194 of the selected user has not surpassed the current point-in-time (step s954), the imaged image is sent to the wireless communication device of the user thereof (step S955). On the other hand, if the sharing time limit 194 of the selected user has surpassed the current point-in-time (step S954), the entry of the user thereof is deleted from the shared list (step S956). Thus, since confirmation of sharing time limit expiring is performed together with the imaging rather than periodically, so control by a timer becomes unnecessary, and is advantageous from the perspective of power consumption.

After this, if there are any other users registered in the shared list which are not yet selected (step S957), these are selected (step S953) and the above-described processing is repeated.

On the other hand, if there are no users registered in the shared list (step S952), the processing is ended without sending an imaged image.

FIG. 31 is a flowchart illustrating a second procedure example of processing during imaging of an image according to an embodiment of the present invention. This procedure example equates to the processing (852) of the wireless communication device A in FIG. 25.

In the event that an image is imaged with the wireless communication device (step S961), if a cancelable time has been set (step S962), the cancelable time is set in the timing unit 160 (timer) (step S963). If the timer times out (step S965) before the user selects cancel (step S964), a thumbnail image is sent to the user registered in the shared list (step S966). On the other hand, if cancel is selected before timing out (step S964), the processing is ended before the thumbnail image is sent (step S967).

Also, in the case that a cancelable time is not set, or in the case that the cancelable time is set to "0" (step S962), the thumbnail image is sent without receiving permission from the user (step S966).

Figure 32:
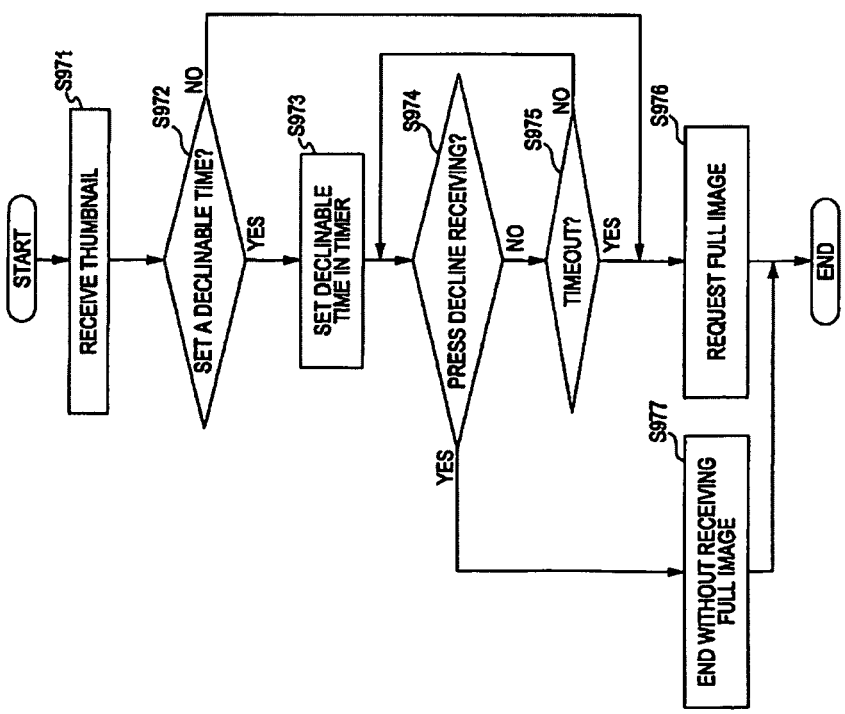
FIG. 32 is a flowchart illustrating a procedure example of processing when receiving a thumbnail image according to an embodiment of the present invention.

FIG. 32 is a flowchart illustrating a procedure example of processing when receiving a thumbnail image according to an embodiment of the present invention. This procedure example equates to the processing (862 through 865) of the wireless communication device B in FIG. 25.

In the event that a thumbnail image is received at a wireless communication device (step S971), if declinable time is set (step S972), the declinable time is set in the timing unit 160 (timer) (step S973). If the timer times out (step S975) before the user selects declining of receiving (step S974), a request for a full image is sent to the user who sent the thumbnail image (step S976). On the other hand, if decline receiving is selected before timing out (step S974), the processing is ended before the request for a full image is sent (step S977).

Also, in the case that a receiving declinable time is not set, or in the case that the receiving declinable time is set to "0" (step S972), the request for a full image is sent without receiving permission from the user (step S976).

Thus, according to an embodiment of the present invention, by transmitting an invitation, the wireless communication device can be transitioned to an image sharing state. With the image sharing state herein, when an image is imaged at one of the wireless communication devices, the imaged image thereof is transferred to the other wireless communication device. Thus, the embodiment of the present invention is particularly useful in the case of sharing images for a limited time during an event, for example, with a friend made at the event venue.

Note that the embodiments according to the present invention are only examples to manifest the present invention, but are not restricted to these specific configurations, and it should be understood by those skilled in the art that various modifications, combinations, sub-combinations and alterations may occur depending on design requirements and other factors insofar as they are within the scope of the appended claims or the equivalents thereof.

That is to say, the communication control unit in the Summary of the Invention corresponds to a communication control unit 120, for example, in the embodiments. Also, the device information holding unit in the Summary of the Invention corresponds to a neighbor node table 130, for example, in the embodiments. Also, the display control unit in the Summary of the Invention corresponds to a display control unit 170, for example, in the embodiments.

The receiving procedure in the Summary of the Invention corresponds to step S912, for example, in the embodiments. Also, the computing procedure in the Summary of the Invention corresponds to step S913, for example, in the embodiments. Also, the display procedure in the Summary of the Invention corresponds to step S924, for example, in the embodiments.

The imaging unit in the Summary of the Invention corresponds to an imaging unit 201, for example, in the embodiments. Also, the shared proposal message transmission unit and image transmission unit in the Summary of the Invention correspond to the communication control unit 120, for example, in the embodiments. Also, the shared list holding unit in the Summary of the Invention corresponds to a shared list holding unit 190, for example, in the embodiments.

The imaging unit in the Summary of the Invention corresponds to an imaging unit 201, for example, in the embodiments. Also, the shared proposal message transmission step in the Summary of the Invention corresponds to step S931, for example, in the embodiments. Also, the shared list holding step in the Summary of the Invention corresponds to step S935, for example, in the embodiments. Also, the image transmission step in the Summary of the Invention corresponds to step S955, for example, in the embodiments.

Note that the processing procedures described according to the embodiments of the present invention may be arranged as a method of having a series of such steps, or may be arranged as a program which causes a computer to execute such a series of procedures by way of a recording medium to store the program.

What is claimed is:

1. A first wireless device configured to communicate with a second wireless device that exists outside a wireless communication range by relaying communication via a third wireless device, the first wireless device comprising:
   communication control means configured to compute a number of communication links through which a signal transmitted from the second wireless device travels until received by the first device;
   an information holding means configured to associate the number of links with information relating to the second wireless device and further configured to hold the number of links and associated information;
   display control means configured to control display of the information relating to the second wireless device and the associated number of links by varying a display size of a graphic relating to the second wireless device, wherein the display size is varied according to the number of links so that a smaller number of links corresponds to a greater display size; and
   display means configured to display, on the first wireless device, the information relating to the second wireless device and the associated number of links.

2. The first wireless device according to claim 1, wherein the signal transmitted from the second wireless device includes an initial lifetime value and a current lifetime value in a header portion,
   wherein the communication control means computes the number of links based on the initial lifetime value and the current lifetime value, and
   wherein the communication control means updates the current lifetime value and transfers the current lifetime value to a fourth wireless device.

3. The first wireless device according to claim 2, wherein the communication control means subtracts 1 from the current lifetime value of the signal, and if the result of the subtraction is not 0, transfers the signal to the fourth wireless device, while also computing the number of links by subtracting the current lifetime value from the initial lifetime value.

4. The first wireless device according to claim 1, wherein the display control means controls display of the number of links and the information relating to the second device.

5. The first wireless device according to claim 1, wherein the display control means controls the display means to display information relating to a user of the second wireless device as the information relating to the second wireless device.

6. A wireless communication system wherein a first wireless device communicates with a second wireless device that exists outside a wireless communication range by relaying communication via a third wireless device, the first wireless device comprising:
   communication control means configured to compute a number of communication links through which a signal transmitted from the second wireless device, travels until received by the first device;
   an information holding means configured to associate the number of links with information relating to the second wireless device and further configured to hold the number of links and associated information;
   display control means configured to control display of the information relating to the second wireless device and the associated number of links by varying a display size of a graphic relating to the second wireless device, wherein the display size is varied according to the number of links so that a smaller number of links corresponds to a greater display size; and
   display means configured to display, on the first wireless device, the information relating to the second wireless device and the associated number of links.

7. A computer-implemented display method for a first wireless device to communicate with a second wireless device that exists outside a wireless communication range by relaying communication via a third wireless device, the method comprising the steps of:
   receiving, at the first device, a signal from the second wireless device via the third wireless device;
   computing, at the first device, a number of communication links through which the signal travels from the second device until received by the first device, wherein the computation is based on the signal; and
   displaying, at the first device, information relating to the second wireless device and the associated number of links by varying a display size of a graphic relating to the second wireless device, wherein the display size is varied according to the number of links so that a smaller number of links corresponds to a greater display size.

8. A non-transitory computer-readable medium storing a program with a series of procedures that, when executed, cause a first wireless device to perform a plurality of steps to communicate with a second wireless device that exists outside a wireless communication range by relaying communication via a third wireless device, the plurality of steps comprising:

receiving a signal from the second wireless device via the third wireless device;

computing a number of communication links through which the signal travels from the second device until received by the first device, wherein the computation is based on the signal; and displaying, at the first wireless device, information relating to the second wireless device and the associated number of links by varying a display size of a graphic relating to the second wireless device, wherein the display size is varied according to the number of links so that a smaller number of links corresponds to a greater display size.

9. A first wireless device configured to communicate with a second wireless device that exists outside a wireless communication range by performing communication via a third wireless device, the first wireless device comprising:

a communication control unit configured to compute a number of communication links through which a signal transmitted from the second wireless device travels until received by the first device;

an information holding unit configured to associate the number of links with information relating to the second wireless device and further configured to hold the number of links and associated information;

a display control unit configured to control display of the information relating to the second wireless device and the associated number of links by varying a display size of a graphic relating to the second wireless device according to the number of links so that a smaller number of links corresponds to a greater display size; and a display unit configured to display, on the first wireless device, the information relating to the second wireless device and the associated number of links.

10. A wireless communication system wherein a first wireless device communicates with a second wireless device that exists outside a wireless communication range by relaying communication via a third wireless device, the first wireless device comprising:

a communication control unit configured to compute a number of communication links through which a signal transmitted from the second wireless device travels until received by the first device;

an information holding unit configured to associate the number of links with information relating to the second wireless device and further configured to hold the number of links and associated information;

a display control unit configured to control display of the information relating to the second wireless device and the associated number of links by varying a display size of a graphic relating to the second wireless device, wherein the display size is varied according to the number of links so that a smaller number of links corresponds to a greater display size; and a display unit configured to display, on the first wireless device, the information relating to the second wireless device and the associated number of links.

\* \* \* \* \*